US007548237B2

(12) United States Patent  (10) Patent No.: US 7,548,237 B2
David et al.  (45) Date of Patent: Jun. 16, 2009

(54) SYSTEM AND METHOD FOR MANAGING VISUAL STRUCTURE, TIMING, AND ANIMATION IN A GRAPHICS PROCESSING SYSTEM

(75) Inventors: Paul C. David, Kirkland, WA (US); Gerhard A. Schneider, Seattle, WA (US); Matthew W. Calkins, Seattle, WA (US); Oreste Dorin Ungureanu, Duvall, WA (US); Ashraf Michail, Redmond, WA (US); Andrey E. Arsov, Sammamish, WA (US); Leonardo E. Blanco, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 91 days.

(21) Appl. No.: 11/499,257

(22) Filed: Aug. 4, 2006

(65) Prior Publication Data

US 2007/0035543 A1 Feb. 15, 2007

Related U.S. Application Data

(63) Continuation of application No. 10/402,322, filed on Mar. 27, 2003, now Pat. No. 7,088,374.

(51) Int. Cl.
*G06T 17/00* (2006.01)
(52) U.S. Cl. ............... 345/420; 345/440; 345/473; 345/474; 345/503; 345/520; 700/245; 709/203; 709/246; 715/234
(58) Field of Classification Search ............... 345/419, 345/420, 619, 629, 473, 474, 440, 503, 520; 700/245; 709/203, 246; 715/234
See application file for complete search history.

(56) References Cited

U.S. PATENT DOCUMENTS 5,261,041 A  11/1993  Susman (Continued)

FOREIGN PATENT DOCUMENTS

WO  WO9900725  6/1998

(Continued)

OTHER PUBLICATIONS

SVG specification version 1.1, Jan. 13, 2003 all sections http://www.w3.org/TR/SVG/.

(Continued)

*Primary Examiner*—Kimbinh T Nguyen
(74) *Attorney, Agent, or Firm*—Workman Nydegger

(57) ABSTRACT

A visual tree structure as specified by a program is constructed and maintained by a visual system's user interface thread. As needed, the tree structure is traversed on the UI thread, with changes compiled into change queues. A secondary rendering thread that handles animation and graphical composition takes the content from the change queues, to construct and maintain a condensed visual tree. Static visual subtrees are collapsed, leaving a condensed tree with only animated attributes such as transforms as parent nodes, such that animation data is managed on the secondary thread, with references into the visual tree. When run, the rendering thread processes the change queues, applies changes to the condensed trees, and updates the structure of the animation list as necessary by resampling animated values at their new times. Content in the condensed visual tree is then rendered and composed. Animation and a composition communication protocol are also provided.

18 Claims, 17 Drawing Sheets

U.S. PATENT DOCUMENTS

| | | | |
|---|---|---|---|
| 5,487,172 A | 1/1996 | Hyatt | |
| 5,500,933 A | 3/1996 | Schnorf | |
| 5,509,115 A | 4/1996 | Butterfield | |
| 5,553,222 A | 9/1996 | Milne et al. | |
| 5,555,368 A | 9/1996 | Orton | |
| 5,727,141 A | 3/1998 | Hoddie | |
| 5,745,761 A | 4/1998 | Celi | |
| 5,752,029 A * | 5/1998 | Wissner | 707/104.1 |
| 5,790,130 A | 8/1998 | Gannett | |
| 5,852,449 A | 12/1998 | Esslinger et al. | 345/473 |
| 5,920,325 A | 7/1999 | Morgan et al. | |
| 5,930,810 A | 7/1999 | Farros et al. | 715/506 |
| 5,936,632 A | 8/1999 | Cunniff | |
| 5,986,667 A | 11/1999 | Jevans | |
| 5,986,675 A | 11/1999 | Anderson | |
| 5,987,627 A | 11/1999 | Rawlings | |
| 6,014,139 A | 1/2000 | Watson et al. | 715/764 |
| 6,075,532 A | 6/2000 | Colleran | |
| 6,092,107 A | 7/2000 | Eleftheriadis | |
| 6,115,713 A | 9/2000 | Pascucci et al. | |
| 6,151,134 A | 11/2000 | Depa | |
| 6,154,215 A | 11/2000 | Hopcroft | |
| 6,160,907 A | 12/2000 | Robotham | |
| 6,195,694 B1 | 2/2001 | Chen et al. | 709/220 |
| 6,215,495 B1 | 4/2001 | Grantham et al. | 345/419 |
| 6,237,092 B1 | 5/2001 | Hayes, Jr. | 713/100 |
| 6,243,856 B1 | 6/2001 | Meyer et al. | 717/146 |
| 6,259,451 B1 | 7/2001 | Tesler | |
| 6,266,053 B1 | 7/2001 | French et al. | 715/500.1 |
| 6,272,650 B1 | 8/2001 | Meyer | |
| 6,275,857 B1 | 8/2001 | McCartney | 709/226 |
| 6,314,470 B1 | 11/2001 | Ward et al. | 719/328 |
| 6,377,263 B1 | 4/2002 | Falacara | |
| 6,411,297 B1 | 6/2002 | Tampieri | |
| 6,487,565 B1 | 11/2002 | Schechter et al. | 715/500.1 |
| 6,538,656 B1 | 3/2003 | Cheung | |
| 6,570,578 B1 | 5/2003 | Smirnov | |
| 6,631,403 B1 | 10/2003 | Deutsch | |
| 6,636,211 B2 | 10/2003 | Chartier | |
| 6,654,931 B1 | 11/2003 | Haskell | |
| 6,675,230 B1 | 1/2004 | Lewallen | |
| 6,707,456 B1 | 3/2004 | Marrin et al. | 345/473 |
| 6,714,201 B1 | 3/2004 | Grinstein | |
| 6,717,599 B1 | 4/2004 | Olano | 715/853 |
| 6,731,314 B1 | 5/2004 | Cheng | |
| 6,732,109 B2 | 5/2004 | Lindberg | |
| 6,741,242 B1 | 5/2004 | Itoh et al. | 345/419 |
| 6,751,655 B1 | 6/2004 | Deutsch | |
| 6,833,840 B2 | 12/2004 | Lifshitz | |
| 6,986,101 B2 | 1/2006 | Cooper | |
| 7,064,766 B2 | 6/2006 | Beda | |
| 7,102,651 B1 | 9/2006 | Louveaux | |
| 7,103,581 B1 | 9/2006 | Suen et al. | |
| 7,103,873 B2 | 9/2006 | Tanner | |
| 7,126,606 B2 | 10/2006 | Beda et al. | |
| 7,161,599 B2 | 1/2007 | Beda | |
| 7,184,038 B2 | 2/2007 | Sowizral | |
| 7,236,165 B2 | 6/2007 | Dautelle | |
| 7,265,756 B2 | 9/2007 | Schneider | |
| 7,305,011 B2 | 12/2007 | Shae | |
| 2001/0000962 A1 | 5/2001 | Rajan | |
| 2002/0019844 A1 | 2/2002 | Kurowski | |
| 2002/0032697 A1 | 3/2002 | French | |
| 2002/0046394 A1 | 4/2002 | Do | |
| 2002/0063713 A1 | 5/2002 | Sowizral et al. | 345/440 |
| 2002/0116417 A1 | 8/2002 | Weinberg et al. | 707/517 |
| 2003/0005045 A1 | 1/2003 | Tanimoto | 709/203 |
| 2003/0110297 A1 | 6/2003 | Tabatabai et al. | 709/246 |
| 2003/0120823 A1 | 6/2003 | Kim et al. | 709/310 |
| 2003/0126557 A1 | 7/2003 | Yardumian et al. | 715/513 |
| 2003/0132937 A1 | 7/2003 | Schneider et al. | 345/473 |
| 2003/0139848 A1 | 7/2003 | Cifra et al. | 700/245 |
| 2003/0194207 A1 | 10/2003 | Chung | |
| 2003/0210267 A1 * | 11/2003 | Kylberg et al. | 345/762 |
| 2004/0039496 A1 | 2/2004 | Dautelle | |
| 2004/0093604 A1 | 5/2004 | Demsey et al. | 719/310 |
| 2004/0110490 A1 | 6/2004 | Steele et al. | 455/412.1 |
| 2004/0189645 A1 | 9/2004 | Beda et al. | 345/473 |
| 2004/0189669 A1 | 9/2004 | David et al. | 345/619 |
| 2004/0216139 A1 | 10/2004 | Rhoda | |
| 2004/0220956 A1 | 11/2004 | Dillon | |
| 2005/0050471 A1 | 3/2005 | Hallisey et al. | 715/734 |
| 2005/0060648 A1 | 3/2005 | Fennelly | |
| 2005/0088436 A1 | 4/2005 | Swedberg et al. | 345/420 |
| 2006/0244754 A1 * | 11/2006 | Beda et al. | 345/557 |

FOREIGN PATENT DOCUMENTS

WO WO9952080 3/1999

OTHER PUBLICATIONS

X3D specification (one section from Google cache), sections 6 and 8—http://www.web3d.org/x3d/specifications/ISO-IEC-19775-IS-X3DAbstractSpecification/ . . . .

Sun Java 3D documentation—Java 3D API Specification http://java.sun.com/products/java-media/3D/forDevelopers/j3Guide/.

W3C consortium,/"SML Base", W3c recommendation Jun. 27, 2001.

Partial European Search Report in EP 02023604 documents considered relevant.

Hyun Suk Kim et al: "Scene Graph for Dynamic Virtual Environment: Spangraph" International Journal of Virtual Reality, IPI Press, Colorado Springs, CO, US, vol. 4, No. 2, 2000, pp. 12-18, OP001039706 ISSN: 1081-1451 *p. 16, col. 2*.

Rikk Cary, Gavin Bell, Chris Marrin: "International Standard iso/iec 14772-1: 1997 Virtual Reality Modeling Language (vrml97)" VRML 97, 1997 pp. 1-236 XP002133320 p. 7, paragraph 3.18: pp. 89-99 section 6.20; p. 149, paragraph B.2.

PCT Int'l Search Report & Written Opinion on App. No. PCT/US04/25723.

Australian Search Report, Application No. SG 200302787-7 completed Jan. 12, 2005.

Hudson, S.E. and Stasko, J.T., Animation Support in a User Interface Toolkit: Flexible, Robust, and Reusable Abstractions, ACM SIGGRAPH Symposium on User Interface Software and Technology, Atlanta, GA, 57-67, 1993.

Walczak, K. and W. Cellary. "Building Database Applications of Virtual Reality with X-VRML". Proc. 7th. Int. Conf. on 3D Web Technology. 2002, SIGGRAPH. pp. 11-120. ISBN 1-58113-468-1.

Parr, T. and T. Rohaly. "A language for creating and manipulating VRML." Proc. 1st Symposium on Virtual Reality Modeling Lang. 1995, pp. 123-131.

Hesina, G.; Schmalistieg, D.; Furhmann, A.; Purgathofer, W. "Distributed Open Inventor: a practical approach to distributed 3D graphics." Proc. ACM Symp. On Virt. Reality Soft. And Tech. 1999, pp. 74-81.

Strauss, P. and R. Carey. "An Object-Oriented 3D Graphics Toolkit" SIGGRAPH (Proc. 19th Ann. Conf. on Comp. Graph. and Int. Tech.) 1992, pp. 341-349.

SVG Tools, Adobe Illustrator, Jul. 6, 2001—http://web.archive.org/web/20010706131221/http://www.adobe.com/svg/tools/other.html.

Scalable Vector Graphics, Adobe SVG Viewer download area, Nov. 2001—http://www.adobe.com/svg/viewer/install/main.html.

W3C Scalable Vector Graphics (SVG)-History-http://www.w3.org/Graphics/SVG/History.

Conal Elliot, Declarative event-oriented programming, Proceedings of the 2nd ACM SIGPLAN international conference on Principles and practice of declaratice programming, p. 56-67, Sep. 20-23, 2000, Montreal, Quebec, Canada.

Notice of Allowance dated Jul. 2, 2007 cited in related Patent No. 7,265,756 (Copy Attached).

Office Action mailed Apr. 4, 2008 cited in related case U.S. Appl. No. 11/454,719 (Copy Attached).

Office Action mailed Sep. 11, 2007 in related case U.S. Appl. No. 10/693,822 (Copy Attached).
Notice of Allowance dated Apr. 1, 2008 cited in related U.S. Appl. No. 10/693,822 (Copy Attached).
Office Action mailed Nov. 16, 2007 in related case U.S. Appl. No. 10/401,717 (Copy Attached).
Office Action mailed Nov. 16, 2007 in related case U.S. Appl. No. 10/693,633 (Copy Attached).
Office Action mailed Jul. 17, 2007 in related case U.S. Appl. No. 10/693,630 (Copy Attached).
Office Action mailed Mar. 20, 2008 in related case U.S. Appl. No. 10/693,630 (Copy Attached).
Office Action mailed Oct. 5, 2007 in related case U.S. Appl. No. 10/693,673 (Copy Attached).
Office Action mailed Apr. 9, 2008 in related case U.S. Appl. No. 10/693,673 (Copy Attached).
Notice of Allowance dated Oct. 2, 2008 cited in U.S. Appl. No. 11/454,719 (Copy Attached).
Notice of Allowance dated Oct. 2, 2008 cited in U.S. Appl. No. 10/693,630 (Copy Attached).
Office Action dated Oct. 7, 2008 cited in U.S. Appl. No. 11/455,166 (Copy Attached).
Notice of Allowance dated Aug. 25, 2008 cited in U.S. Appl. No. 10/693,673 (Copy Attached).
Notice of Allowance dated Oct. 16, 2008 cited in U.S. Appl. No. 10/401,717 (Copy Attached).
Notice of Allowance dated Sep. 9, 2008 cited in U.S. Appl. No. 10/693,822 (Copy Attached).
Notice of Allowance dated May 30, 2008 cited in related U.S. Appl. No. 10/693,633 (Copy Attached).

* cited by examiner

SYSTEM AND METHOD FOR MANAGING VISUAL STRUCTURE, TIMING, AND ANIMATION IN A GRAPHICS PROCESSING SYSTEM

CROSS-REFERENCE TO RELATED APPLICATIONS

The present invention is related to the following copending U.S. patent applications: Ser. No. 10/184,795 entitled "Multiple-Level Graphics Processing System and Method;" Ser. No. 10/184,796, entitled "Generic Parameterization for a Scene Graph;" Ser. No. 10/185,775 entitled "Intelligent Caching Data Structure for Immediate Mode Graphics;" each filed on Jun. 27, 2002; and U.S. patent applications: Ser. No. 10/693,673 entitled "Visual and Scene Graph Interfaces" ; and Ser. No. 10/693,633 entitled "Markup Language and Object Model for Vector Graphics", filed concurrently herewith. Each related application is assigned to the assignee of the present patent application and hereby incorporated by reference in its entirety.

FIELD OF THE INVENTION

The invention relates generally to computer systems, and more particularly to the processing of graphical and other video information for display on computer systems.

BACKGROUND OF THE INVENTION

In contemporary computing systems, the capability of graphics and video hardware is growing at a fast pace. In fact, to an extent, the graphics system in contemporary computing systems may be considered more of a coprocessor than a simple graphics subsystem. At the same time, consumers are expecting more and more quality in displayed images, whether viewing a monitor, television or cellular telephone display, for example.

However, memory and bus speeds have not kept up with the advancements in main processors and/or graphics processors. As a result, the limits of the traditional immediate mode model of accessing graphics on computer systems are being reached. At the same time, developers and consumers are demanding new features and special effects that cannot be met with traditional graphical windowing architectures.

Although certain game programs have been designed to take advantage of the graphics hardware, such game programs operate with different requirements than those of desktop application programs and the like, primarily in that the games do not need to be concerned with other programs that may be concurrently running. Unlike such game programs, applications need to share graphics and other system resources with other applications. They are not, however, generally written in a cooperative, machine-wide sharing model with respect to graphics processing.

For example, performing animation with desktop applications currently requires specialized single-purpose code, or the use of another application. Even then, achieving smooth animation in a multiple windowed environment is difficult if not impossible. In general, this is because accomplishing smooth, high-speed animation requires updating animation parameters and redrawing the scene (which requires traversing and drawing data structures) at a high frame rate, ideally at the hardware refresh rate of the graphics device. However, updating animation parameters and traversing and drawing the data structures that define a scene are generally computationally-intensive. The larger or more animate the scene, the greater the computational requirement, which limits the complexity of a scene that can be animated smoothly.

Compounding the problem is the requirement that each frame of the animation needs to be computed, drawn, and readied for presentation when the graphics hardware performs a display refresh. If the frame is not ready when required by the hardware, the result is a dropped or delayed frame. If enough frames are dropped, there is a noticeable stutter in the animated display. Also, if the frame preparation is not synchronized with the refresh rate, an undesirable effect known as tearing may occur. In practice, contemporary multitasking operating systems divide computational resources among the many tasks on the system. However, the amount of time given for frame processing by the operating system task scheduler will rarely align with the graphics hardware frame rate. Consequently, even when sufficient computational resources exist, the animation system may still miss frames due to scheduling problems. For example, an animation task may be scheduled to run too late, or it may get preempted before completing a frame, and not be rescheduled in time to provide a next frame for the next hardware refresh of the screen. These problems get even more complex if the animated graphics need to be composited with video or other sources of asynchronously generated frames.

In sum, the current (e.g., WM_PAINT) model for preparing the frames requires too much data processing to keep up with the refresh rate when complex graphics effects (such as complex animation) are desired. As a result, when complex graphics effects are attempted with conventional models, instead of completing the changes in the next frame that result in the perceived visual effects in time for the next frame, the changes may be added over different frames, causing results that are visually and noticeably undesirable.

A new model for controlling graphics output is described in the aforementioned U.S. patent application Ser. Nos. 10/184,795, 10/184,796, and 10/185,775. This new model provides a number of significant improvements in graphics processing technology. For example, U.S. Ser. No. 10/184,795 is generally directed towards a multiple-level graphics processing system and method, in which a higher-level component (e.g., of an operating system) performs computationally intensive aspects of building a scene graph, updating animation parameters and traversing the scene graph's data structures, at a relatively low operating rate, in order to pass simplified data structures and/or graphics commands to a low-level desktop composition component. Because the high-level processing greatly simplifies the data, the low-level component can operate at a faster rate, (relative to the high-level component), such as a rate that corresponds to the frame refresh rate of the graphics subsystem, to process the data into constant output data for the graphics subsystem.

U.S. Ser. No. 10/184,796 describes a parameterized scene graph that provides mutable (animated) values and parameterized graph containers such that program code that wants to draw graphics (e.g., an application program or operating system component) can selectively change certain aspects of the scene graph description, while leaving other aspects intact. The program code can also reuse already-built portions of the scene graph, with possibly different parameters. As can be appreciated, the ability to easily change the appearance of displayed items via parameterization and/or the reuse of existing parts of a scene graph provide substantial gains in overall graphics processing efficiency.

U.S. Ser. No. 10/185,775 generally describes a caching data structure and related mechanisms for storing visual information via objects and data in a scene graph. The data structure is generally associated with mechanisms that intelligently control how the visual information therein is populated and used. For example, unless specifically requested by the application program, most of the information stored in the data structure has no external reference to it, which enables this information to be optimized or otherwise processed. As can be appreciated, this provides efficiency and conservation of resources, e.g., the data in the cache data structure can be processed into a different format that is more compact and/or reduces the need for subsequent, repeated processing, such as a bitmap or other post-processing result.

While the above improvements provide substantial benefits in graphics processing technology, there still needs to be a way for effectively use this improved graphics model and its other related improvements in a straightforward manner. What is needed is a comprehensive yet straightforward way to output complex graphics in an efficient manner.

SUMMARY OF THE INVENTION

Briefly, the present invention provides a decoupled composition service, in conjunction with data structures, a communication protocol and animation functionality, that manage visual structure, timing, and animation in a graphics processing system. A visual system receives calls from an application program and constructs a hierarchical scene graph data structure based on those calls. A user interface thread in the visual system runs to provide any changes made by the application program to a change queue, such as commands. A first decoupled part of the composition service constructs a compositor data structure (e.g., a tree) based on the commands in the change queue. The first decoupled part of the composition service may comprise a rendering and animation thread running in the same process as the user interface thread of the visual system. Via a composition communications protocol, a second decoupled part of the composition service receives data based on the composition data structure, along with similar data corresponding to other application programs, and provides appropriate graphics commands to a graphics subsystem, such as at a rate that matches the refresh rate of the graphics hardware.

The changes to the visual tree structure as specified by the application program are added to the change queue, and used by the secondary rendering and animation thread to maintain a condensed visual tree. Static subtrees in this tree are collapsed by the rendering and animation thread, leaving a condensed tree with only animated attributes such as transforms as parent nodes in the tree. The rendering and animation thread updates these parent nodes at appropriate animation intervals, such that animation data is managed on the secondary thread, with references into the visual tree. Thus, when run, the rendering and animation thread processes the change queues, applies changes to the condensed trees, and updates the structure of the animation list as necessary by resampling animated values at their new times. Content in the condensed visual tree is then rendered and composed via another decoupled part of the composition service that provides lower-level desktop composition, including compositing similar data from rendering threads corresponding to the graphics output of other applications.

A composition communication protocol is provided, by which client visual systems connect and disconnect for communication with the composition service. Via the protocol, clients also construct data structures, change their attributes, batch changes, and update animated content. In one implementation, clients can also read information back.

Animation functions are also provided, allowing clients to specify parameters and other settings that control the behavior of animated content. These may be applied by the rendering and animation thread to provide smooth animation.

Other benefits and advantages will become apparent from the following detailed description when taken in conjunction with the drawings, in which:

DETAILED DESCRIPTION

Exemplary Operating Environment

Figure 1:
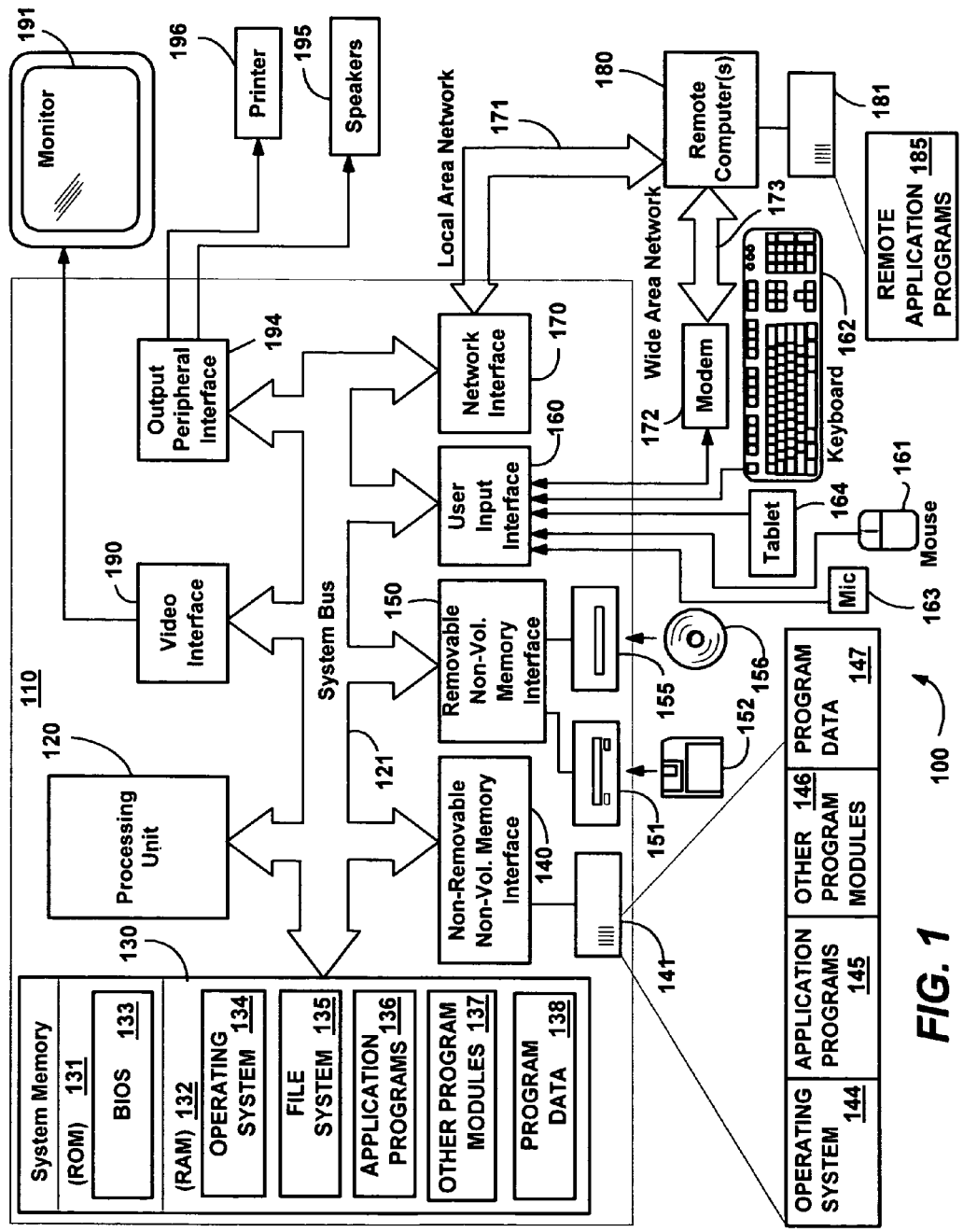
FIG. 1 is a block diagram representing an exemplary computer system into which the present invention may be incorporated.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general purpose computing device in the form of a computer 110. Components of the computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, Accelerated Graphics Port (AGP) bus, and Peripheral Component Interconnect (PCI) bus also known as Mezzanine bus.

The computer 110 typically includes a variety of computer-readable media. Computer-readable media can be any available media that can be accessed by the computer 110 and includes both volatile and nonvolatile media, and removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 110. Communication media typically embodies computer-readable instructions, data structures, program modules or other data in a modulated data signal includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136 and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media, described above and illustrated in FIG. 1, for example, hard disk drive 141 is illustrated as storing operating system 144, application programs 145, other program modules 146 and program data 147. Note that these components can either be the same as or different from operating system 134, application programs 135, other program modules 136, and program data 137. Operating system 144, application programs 145, other program modules 146, and program data 147 are given different numbers herein to illustrate that, at a minimum, they are different copies. A user may enter commands and information into the computer 110 through input devices such as a tablet (electronic digitizer) 164, a microphone 163, a keyboard 162 and pointing device 161, commonly referred to as mouse, trackball or touch pad. Other input devices (not shown) may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. The monitor 191 may also be integrated with a touch-screen panel 193 or the like that can input digitized input such as handwriting into the computer system 110 via an interface, such as a touch-screen interface 192. note that the monitor and/or touch screen panel can be physically coupled to a housing in which the computing device 110 is incorporated, such as in a tablet-type personal computer, wherein the touch screen panel 193 essentially serves as the tablet 164. In addition, computers such as the computing device 110 may also include other peripheral output devices such as speakers 195 and printer 196, which may be connected through an output peripheral interface 194 or the like.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160 or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Graphics Architecture

In one described implementation, the present invention is generally incorporated into a media integration layer stack, into which an application program or the like submits various data to a high level visual system, such as by directly making calls to a visual API layer or providing markup that is interpreted into calls to the visual API layer. The visual system constructs a hierarchical scene graph based on the data submitted to it, and at some rendering time, processes the scene graph into commands and other data and asynchronously communicates with a compositor service in the stack to process those commands and other data into its own retained data structure. A lower-level compositor system may combine communications from possibly multiple visual systems (clients) into graphics commands that are understood by a graphics subsystem, and animation commands or intervals modifying portions of the retained graphics data. The lower-level compositor system provides those graphics commands to the graphics subsystem at a rate that corresponds (e.g., is at or near) the refresh rate of the graphics hardware.

One aspect of the present invention is generally directed to receiving and processing program code-initiated drawing instructions and other information (e.g., image bitmaps), in order to render graphical output on the system display. To this end, the present invention provides a system and method implemented in various components, data structures and a communications protocol, which together enable a higher-level composition engine, e.g., in a user interface thread and rendering thread associated with the visual system, to provide data to a lower-level animation and compositing engine, or compositor. The visual system provides functions (e.g., application programming interfaces, or APIs) to application programs and the like to enable those programs to populate a scene graph with data structures, drawing primitives (commands), and other graphics-related data.

Figure 2:
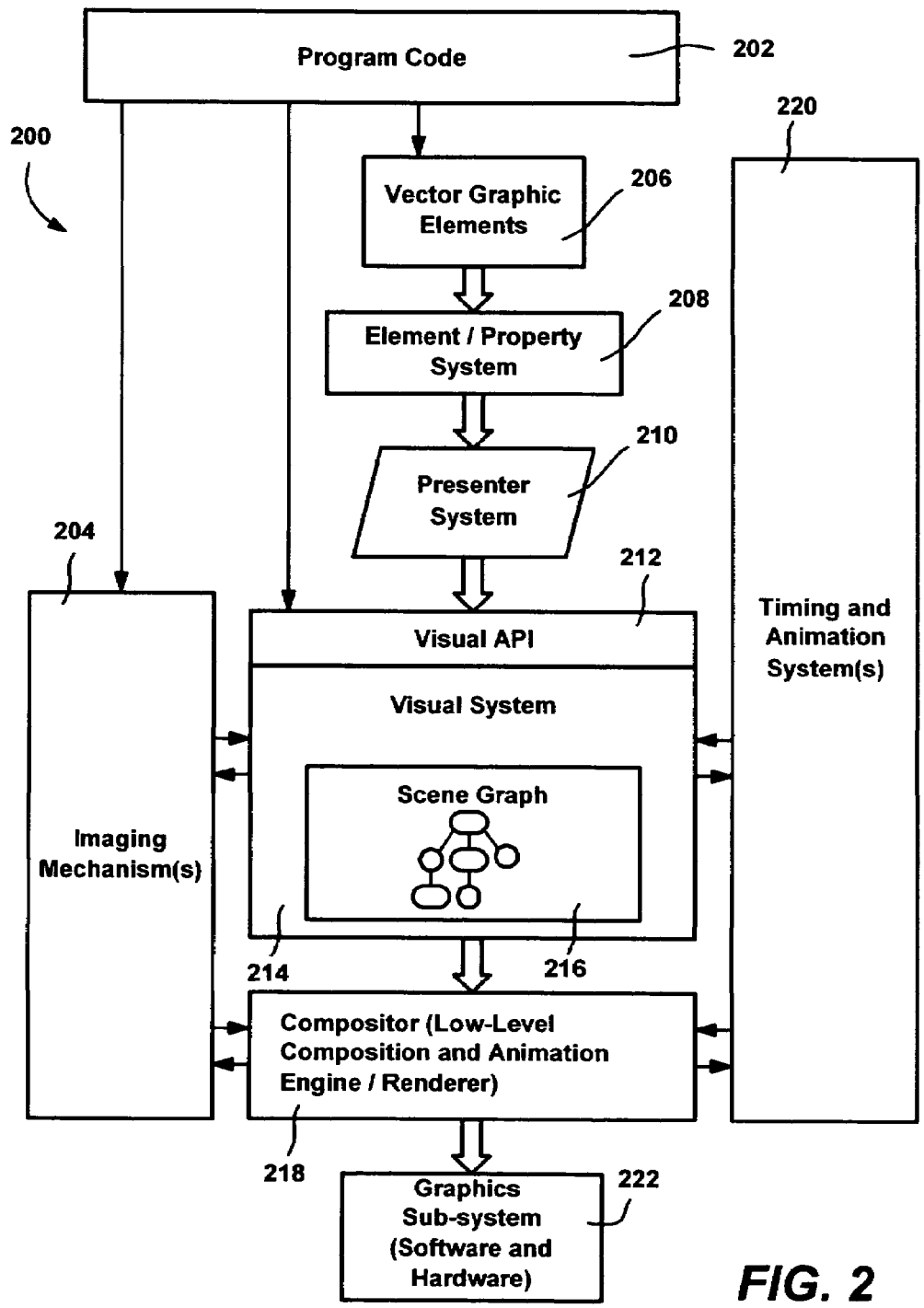
FIG. 2 is a block diagram generally representing components in a layered architecture in accordance with an aspect of the present invention.

FIG. 2 represents a general, layered architecture 200 into which the present invention may be implemented. As represented in FIG. 2, program code 202 (e.g., an application program or operating system component or the like) may be developed to output graphics data in one or more various ways, including via imaging 204, via vector graphic elements 206, and/or via function/method calls placed directly to a visual application programming interface (API) layer 212. The use of vector graphic elements is described in the aforementioned copending patent application entitled "Markup Language and Object Model for Vector Graphics," while direct interaction with the API layer is further described in the aforementioned copending patent application entitled "Visual and Scene Graph Interfaces."

In general, the imaging mechanism 204 provides the program code 202 with a mechanism for loading, editing and saving images, e.g., bitmaps. These images may be used by other parts of the system, and there is also a way to use the primitive drawing code to draw to an image directly. Vector graphics elements 206 provide another way to draw graphics, consistent with the visual system's object model. Vector graphic elements 206 may be created via a markup language, which an element/property system 208 and presenter system 210 processes to make appropriate calls to the visual API layer 212. In general the vector graphic elements 206 are parsed into objects of the object model from which a scene graph is drawn, which may be provided to the scene graph via an element level via the element/property system 208 and presenter system 210, or may be provided in a more efficient manner at a resource level.

In one implementation, the graphics layer architecture 200 includes a visual system 214, which includes or is otherwise associated with a scene graph 216 comprising hierarchically-arranged objects, constructed via direct or indirect calls to the visual API 212. In general, the scene graph models the structural qualities and specific rendering data generated by the API calls, and also provides a set of read services or properties for the application to query. In general, the visual API layer 212 provides the program code (and the presenter system) with an interface to the scene graph 216, including the ability to create objects, open and close objects to provide data to them, and so forth. In other words, the visual system 214 exposes a unified media API layer 212 by which developers may express intentions about graphics and media to display graphics information, and provide an underlying platform with enough information such that the platform can optimize the use of the hardware for the program code. For example, the underlying platform will be responsible for caching, resource negotiation and media integration.

In accordance with an aspect of the present invention and as described below, the visual system 214 acts as a client of the compositor (lower-level composition and animation engine) 218, and communicates appropriate data to the compositor such that the desired frame is rendered. In general, the visual system 214 includes a user interface component that typically performs more computationally-expensive operations than the compositor 218, and thus this aspect of the visual system 214 typically operates at a relatively slower rate with respect to the operating rate of the compositor. Note that the operating rate of the compositor 218 may, for example, match the refresh rate of the graphics hardware. Further, note that as used herein, the terms "high-level" and "low-level" are similar to those used in other computing scenarios, wherein in general, the lower a software component relative to higher components, the closer the component is to the hardware. Thus, for example, graphics information sent from the visual system's high-level composition and animation engine code may be received at the low-level desktop compositing and animation engine, where the information is used to send graphics data to the graphics subsystem 222 including the hardware.

In accordance with an aspect of the present invention, the visual system 214 (asynchronously) communicates various information such as scene change data, instructions such as animation function data and possibly other data (e.g., pointers to bitmaps) that is processed by a rendering thread into data provided to the compositor 218. In other words, the visual system 214 includes a user interface thread and rendering thread that build on a lower-level composition system 218, shared across multiple desktop applications, as described below. This lower-level composition system 218 matches the device refresh rate, and resides in a process distinct from the applications which send it content. This decoupling from the individual client (applications') visual systems permits the expense of an individual application animation to be properly adjudged and handled by the system scheduler. Further, the application-resident composition engine (thread) may group its dedicated thread to a category that is common to like application-resident composition threads. For example, using a CPU scheduling reserve system, an upper and lower bound for CPU percentage consumption may be applied to the applications executing on the system.

As described below, the visual system 214 integrates with the timing and animation systems 220 to provide declarative (or other) animation control (e.g., animation functions, intervals and other parameters) and timing control. Note that the animation system allows animate values to be passed essentially anywhere in the system, including, for example, at the element property level, inside of the visual API layer 212, and in any of the other resources. The timing system is exposed at the element and visual levels.

The compositor 218 manages the composing, animating and rendering of the scene, which is then provided to the graphics subsystem 222. In one implementation, the visual system includes a user interface thread that works in conjunction with a second thread (in the same process) that provides animation and composition functionality. Thus, there is a composition component in each visual system that is decoupled from the composition components (in a different process) that implement the rendering of graphics from the scenes of multiple applications. Note, that at times it is advantageous for some of the rendering to happen at higher levels, e.g., while the lower layers service requests from multiple applications, the visual systems are instantiated on a per-application basis, whereby is possible via the imaging mechanisms to perform time-consuming or application-specific rendering at higher levels, and pass references to a bitmap to the compositor 218.

Figure 3:
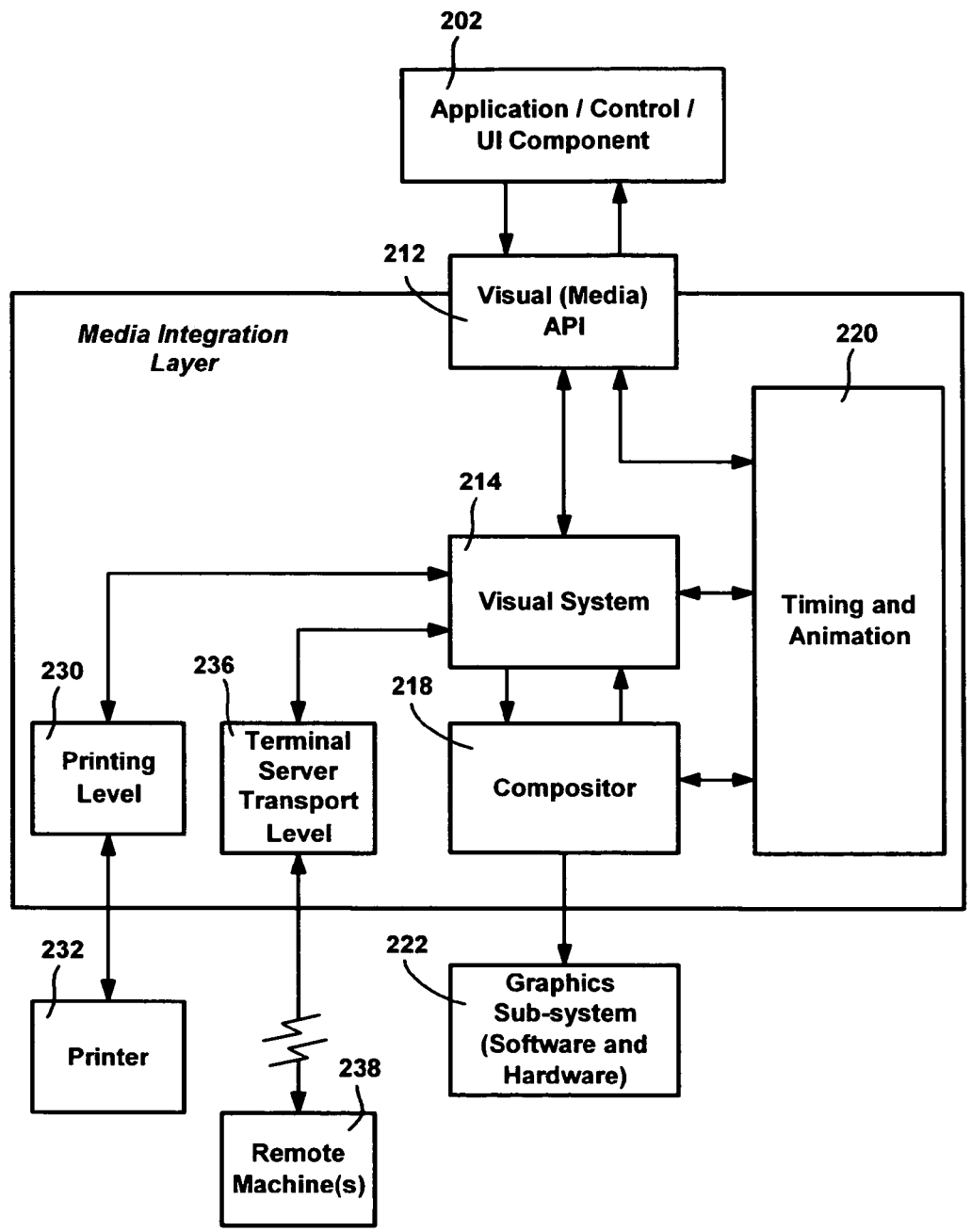
FIG. 3 is a block diagram representing a media integration layer architecture into which the present invention may be incorporated.

As represented in FIG. 3, alternatively or in addition to locally displayed output, the compositor 218 (or one similar thereto) may provide the rendering and animation instructions in an appropriate format to lower-level printing code 230 for sending fixed image data to a printer 232 or the like, and/or may provide rendering instructions and simple animation intervals in an appropriate format to a lower-level terminal transport server 236 for transmission to remote machines 238. Note that richer information also may be passed across the network, e.g., it may be desirable to have the remote machine handle mouse rollover effects locally, without any network traffic.

Managing Visual Structure, Timing, and Animation

Figure 4:
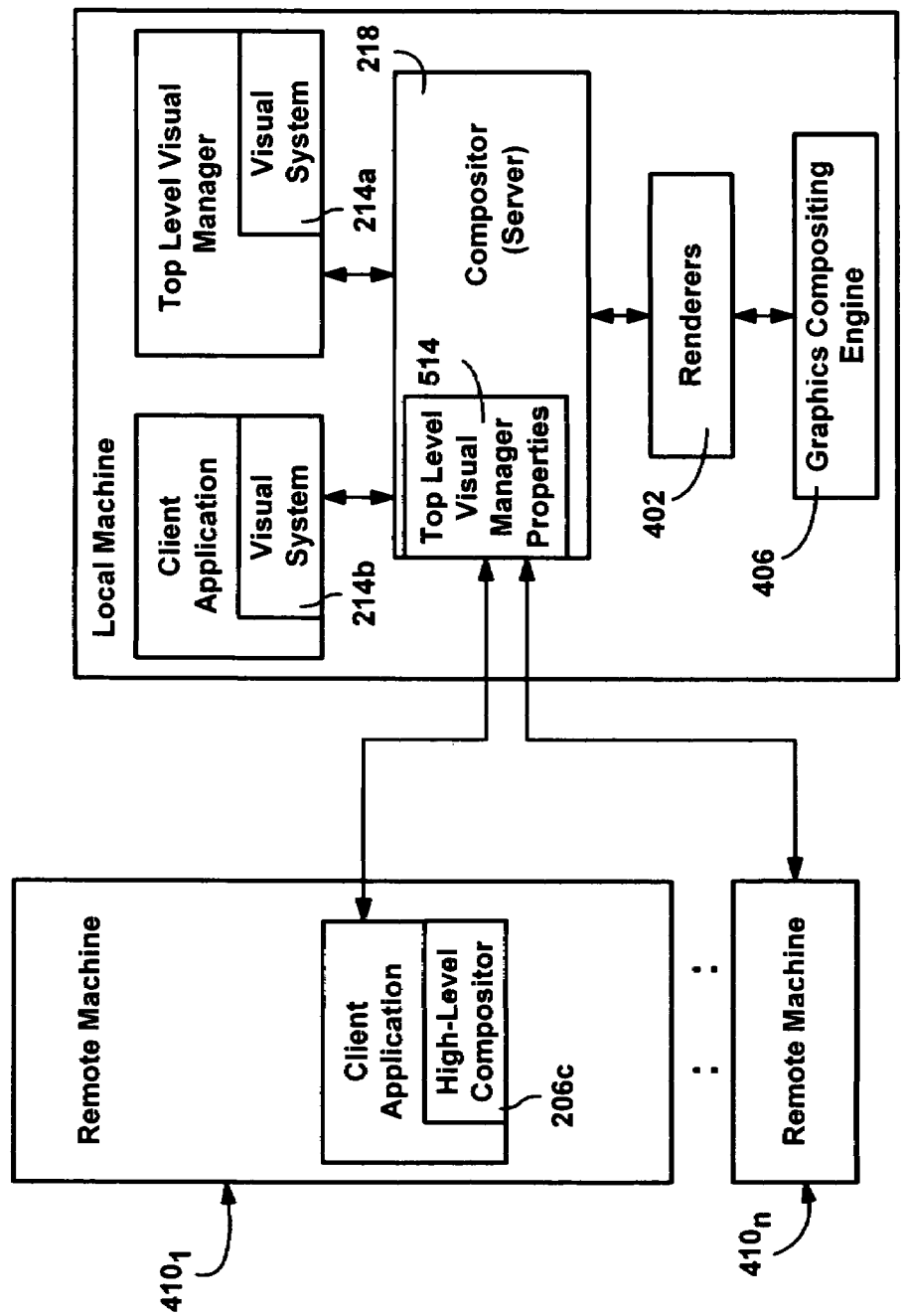
FIG. 4 is a block diagram representing a general flow of communication into and out of a low-level desktop compositor and other rendering components in accordance with one aspect of the present invention.

A primary purpose of the compositor 218 is to provide an abstraction of the low-level rendering stack of the media integration layer, which allows for (1) high frame rate animation for client graphics applications, (2) the implementation of window management-like support, and (3) support for remoting graphics services over a network connection. As represented in FIG. 4, the compositor 218 acts as a server, to among other things coordinate high frame rate animation requests received from multiple clients (e.g., corresponding to client visual systems 214a and 214b supporting multiple applications), by using services provided by a collection of renderers 402. The renderers 402 generate rendering actions that act on rendering abstractions (also referred to as visuals) implemented by a graphics compositing engine 406.

Thus, a primary function of the compositor 218 is to provide compositing services to the rendering stack. The compositor 218 achieves this via a rendering and animation thread in each visual system, to maintain a retain mode data structure. In one implementation, the compositing data structure comprises a compositor tree associated with a composition rendering target. The nodes in the tree include compositable objects (COBs) and PAILs (parameterized animate instruction lists). As described below, the compositable objects comprise composition containers, while the PAILs comprise graphics instructions streams generated by the components using the compositor and rendered by the compositor; each PAIL is generally a self-contained graphics encoding, and the objects it references include Bitmaps, GlyphRuns, Video players and compositable objects.

The following table lists the objects manipulated for composition:

| Object | Creator |
| --- | --- |
| COB | Compositor |
| Composition Target | Compositor |
| PAIL | External |
| Bitmap | External |
| GlyphRun | External |
| Video player | Compositor |

In general, client visual systems specify compositable content by creating and manipulating resources, media instruction blocks, compositable objects, compositable groups, compositing trees and compositing targets. Resources include pens, brushes, images, video clips and paths, such as described in the aforementioned copending patent applications entitled "Visual and Scene Graph Interfaces" and "Markup Language and Object Model for Vector Graphics." In general, the client associates a resource with a handle by creating a resource and supplying device-independent data associated with the given resource type, (e.g., image data for images, or color for brushes). The resource is sent to the low-level desktop compositing service where it may be realized into a device-specific form. As described below, client visual systems may create resources explicitly by calling methods, such as on a factory API. Note that creating a resource is potentially an expensive operation, as the resource will contend for one or more graphics processing unit (GPU) resources.

Resources comprise pieces of content that may be device-specific, and/or may be potentially animate. Client visual system code explicitly creates or destroys resources, using a handle to reference each resource. Internally, one or more device-specific realizations for a resource may be stored. A resource realization is created as needed, and may be discarded at any time in order to accommodate other resource realizations. Note that referencing a resource may be expensive when the reference results in a new realization.

The visual system may expose wrapper classes that allow applications to easily update resource attributes. In such an event, the wrapper classes manage the resource lifetime as a consequence of the wrapper lifetime, e.g., garbage collection of the wrapper results in a request to delete the resource from the resource tables. Inside of the compositing service, resource lifetime is managed via reference counting.

Media instruction blocks live inside of compositable objects, (described below), and contain rendering instructions and references to resources. Media instruction blocks expose a fundamental level of structural update granularity to the client visual system, and thereby provide a medium for changes to the lower-level rendering structures. For example, media instruction blocks specify the rendering primitives, and may contain references to resources. Media instruction blocks may also contain device-independent representations of resources as these resources are created.

Media instruction blocks are created in the visual system, outside of the compositor, and then registered with the compositor. There may be a many-to-one mapping of instruction lists to a compositable object. Media instruction blocks are referenced by the client visual systems as a handle that is returned at the end of a batch of rendering calls. In one implementation, clients create media instruction blocks implicitly by calling a function, e.g., beginscene, and supplying the destination compositable object. In this implementation, the handles (or ordinals) used to reference the media instruction blocks will be relevant only within the compositable object specified when the media instruction block was created, that is, a visual system client may not migrate a media instruction block from one compositable object to another. There are also methods to post, update, and remove media instruction blocks. Note that the expense associated with creating and maintaining a media instruction block relates to the rendering expense. There are limited ways to manipulate media instruction blocks, so the overhead is minimal.

Compositable objects comprise a fundamental unit of spatial containment available to client applications, and may contain one or more media instruction blocks. Compositable objects provide clients with a grouping mechanism for related media instruction blocks, as generally described above. The media instruction blocks within each compositable object may be added, replaced or updated independently of one another. Client visual systems create compositable objects explicitly, e.g., by calling a CreateCompositableObject method on the compositing service, and in one example implementation, each compositable object has an explicit location and extent in pixel space. In addition to controlling location and extent, a compositable object may impose other rules, including clip region, hit region, transform, opacity, and compositing rules on its constituent media instruction blocks. In this manner, compositable objects apply attributes such as origin, extent, clip region, transform, blend mode, and alpha to the end result of the rendered media instruction blocks. The client visual system may manipulate these attributes directly.

During a compositing pass, each compositable object iterates over its media instruction blocks, e.g., in painter's order. The re-ordering of media instruction blocks within a compositable object is feasible, but in one implementation is not supported. Note that compositable objects may be processed into bitmaps that are cached as desired by the compositing service, such as for efficiency. Note that compositable objects are bound to a process, and thus if a client visual system wishes to use a compositable object within multiple threads, the visual system will be responsible for its own access synchronization. To avoid complexity, clients should relegate compositable object access to a single thread.

Creating a compositable object requires an update to the compositing tree structure (described below), in addition to updating the handle tables (as is required by other composited content), and thus will be a somewhat expensive operation, relative to the expense of creating media instruction blocks.

Compositing trees are hierarchically-arranged compositable objects. There is a primary compositing tree, representing the screen content or desktop (destination). Additionally, the client may create one or more secondary trees representing off-screen compositing, such as to representing compositable objects participating in an effect. The operations available on a secondary compositing tree include insert, remove, and compose.

A compositable object may exist in only one compositing tree, primary or secondary, however by using an off-screen compositing target, the results of one tree may be reflected in an image resource that is composed into another tree. There are no compositional ordering semantics between secondary compositing trees. A secondary tree may compose in the client process in response to a blocking compose call, or asynchronously in the compositing service process. When a secondary tree composes in the compositing service process, the client may specify a compositing frequency. If a secondary tree is to compose during the same pass as the primary (regardless of frequency), it will precede the primary. This is to allow for any image resources representing the secondary tree results to be reflected in the primary tree's content. Note that in addition to utilizing secondary trees as resources, the visual system may associate a composition tree with different targets (off-screen surfaces) as desired. In this manner, the visual system can choose to compile to, or cache a pre-composed surface instead of a deeper visual subtree.

To match the trees with a destination, compositing targets comprise the destination surface for a compositing tree. For example, in the case of the primary compositing tree, the target will be a backbuffer, while in the case of a secondary tree the target will be an off-screen surface (which may be referenced as an image resource). This off-screen surface may be referenced as a resource inside of a media instruction block hosted by a compositable object associated with another compositing tree. If a compositing tree references its own results as an image resource, the resource content will not be current. In other words, circular references are permitted, but the results are undefined.

The compositing tree comprises the compositable objects. For performance reasons, in one implementation, compositable objects are arranged in a nested composition hierarchy, that is, a tree, with certain nodes flattened to reduce complexity. With this lesser amount of complexity, the compositor has greater flexibility to throttle back more expensive compositable objects with a minimal amount of evaluation time. As described below with reference to FIG. 5, the flattened hierarchy also facilitates better hinting regarding media instruction block content. For example it is possible to build a bounding rectangle for media instruction blocks inside of a compositable object, however when nested compositable objects are used, tracking is required. Note that even though nesting makes it more difficult to adjudge composition expense, it is permitted to nest compositable objects inside of other compositable objects to provide the visual system with flexibility. Note that the effect of nesting may be accomplished indirectly by creating a secondary compositing tree and referencing its compositing target as an image resource.

One consequence of the compositing tree structure is that clients may require alternative means to ensure atomic manipulation of multiple compositable objects. For example, consider a client using a compositable object to hold a window's client area content, with the window manager using another compositable object to hold the non-client area content. The window system needs a way to change the compositable object stacking order without requiring that content be consolidated into a single compositable object. Because compositable objects are bound to a particular process, two or more compositable objects need to be able to be grouped within a compositing tree, as the window manager and client will likely live in different processes. Thus, if the window manager wishes to bring a compositable object to the front of the desktop, the window manager operates on the group. When the grouping is no longer required, compositable objects are removed from the group.

Compositable groups are thus provided, and allow client visual systems to specify that two or more compositable objects are to be updated or rendered atomically, and are to move together in the compositable object stacking order. Operations available on a compositing group include inserting and removing them. In one implementation, when a set of compositable objects has been grouped together, the individual compositable objects are no longer individually addressable for the purposes of changing the stacking order, although grouping does not affect a compositable object's ability to receive new or updated media instruction blocks. Note that it is alternatively feasible to allow the addressability of compositable objects within a group.

Figure 5:
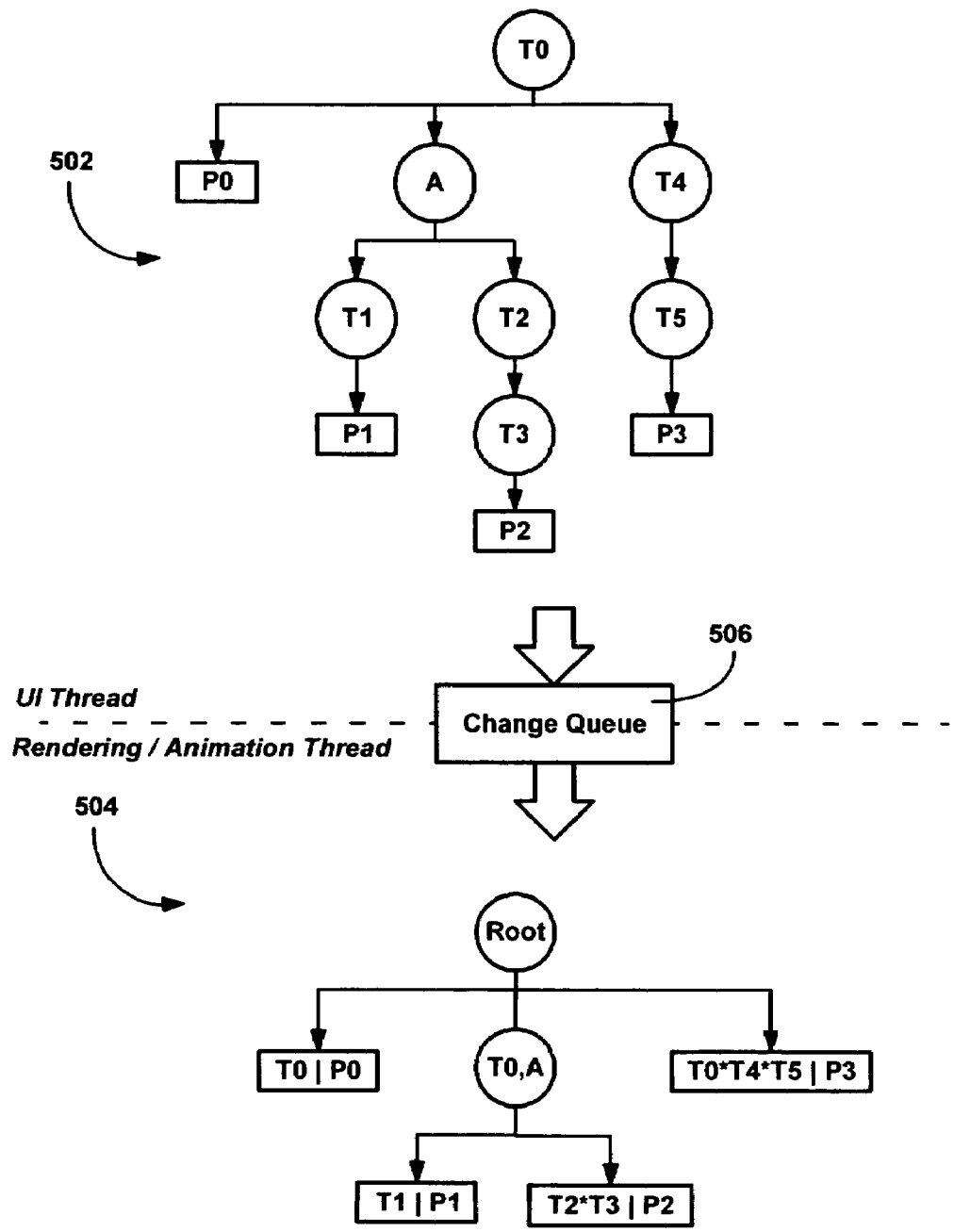
FIG. 5 is a representation of a tree maintained in the visual system and a resultant tree in the compositor in accordance with one aspect of the present invention.

In accordance with one aspect of the present invention, as mentioned above, static data in the higher-level, cache data structure tree is collapsed into a flat list in the lower-level, compositor data structure. This is represented in FIG. 5, for example, in which a high-level tree 502 has its transform nodes (T1-T6) and primitives (P0-P3) hierarchically arranged, but the lower-level tree 504 has flattened every static node into COBs and PAILs. To this end, any transform calculations or the like are made, and the results stored in the compositor tree 504 as one or more static values, until the cache data structure tree 502 is changed such that one of the collapsed nodes and its children are no longer correct. However, in FIG. 5, an animate transform node (A) and the nodes and primitives under those animate transform nodes are not static and thus not collapsed, because they will need to be updated at an appropriate animation interval, as described below.

In general, the nodes and primitives at the compositor level are directed to data in the form of lines, glyphs and so on, and there is no concept at the visual system's compositor level as to what those lines and glyphs actually form when rendered. However, this can reduce efficiency, for example, because objects and data that need to be frequently updated may be collapsed. For example, dialog boxes in which a user is entering text via a blinking cursor, or mouse movement that changes the display (e.g., hovering changes the color displayed beneath the mouse) will result in frequent changes to certain parts of the compositor structure 504. While this is determinable to an extent at the compositor by watching for frequent changes and not collapsing changing sections, another solution is to provide a hinting mechanism. In general, the hinting mechanism allows a program to relay information to the visual system and thereby to its compositor component, to recommend that a certain section of data will likely change frequently, and therefore for efficiency should not be collapsed whenever possible.

As also generally illustrated in FIG. 5 by the dashed-line separator, in a preferred implementation, as described above, the visual system includes code running in the same process, but on different threads, e.g., there is one thread referred to as a user interface thread, and another thread referred to as a rendering/animation thread. The separation of operations by threads enables smooth animations, and also facilitates low-level compositing on a remote machine, as described below. Note that compositing on a remote machine requires that externally created objects be serializable for transmission to the remote machine on which the composition rendering thread is running. Further, having the threads in the same process provides benefits with respect to scheduling, e.g., when a process is running in the foreground, the threads are scheduled accordingly, relative to processes running in the background.

Objects may be shared across threads via the use of a critical section set around a composition tree, although this limits performance. Thus, for performance reasons, as described below, control of the composition tree is performed by packetizing UI thread functions into command packets and queuing the packets into a packet change queue 506. The render thread dequeues the packets from the change queue 506 and executes the appropriate commands on the composition tree 504.

Figure 6:
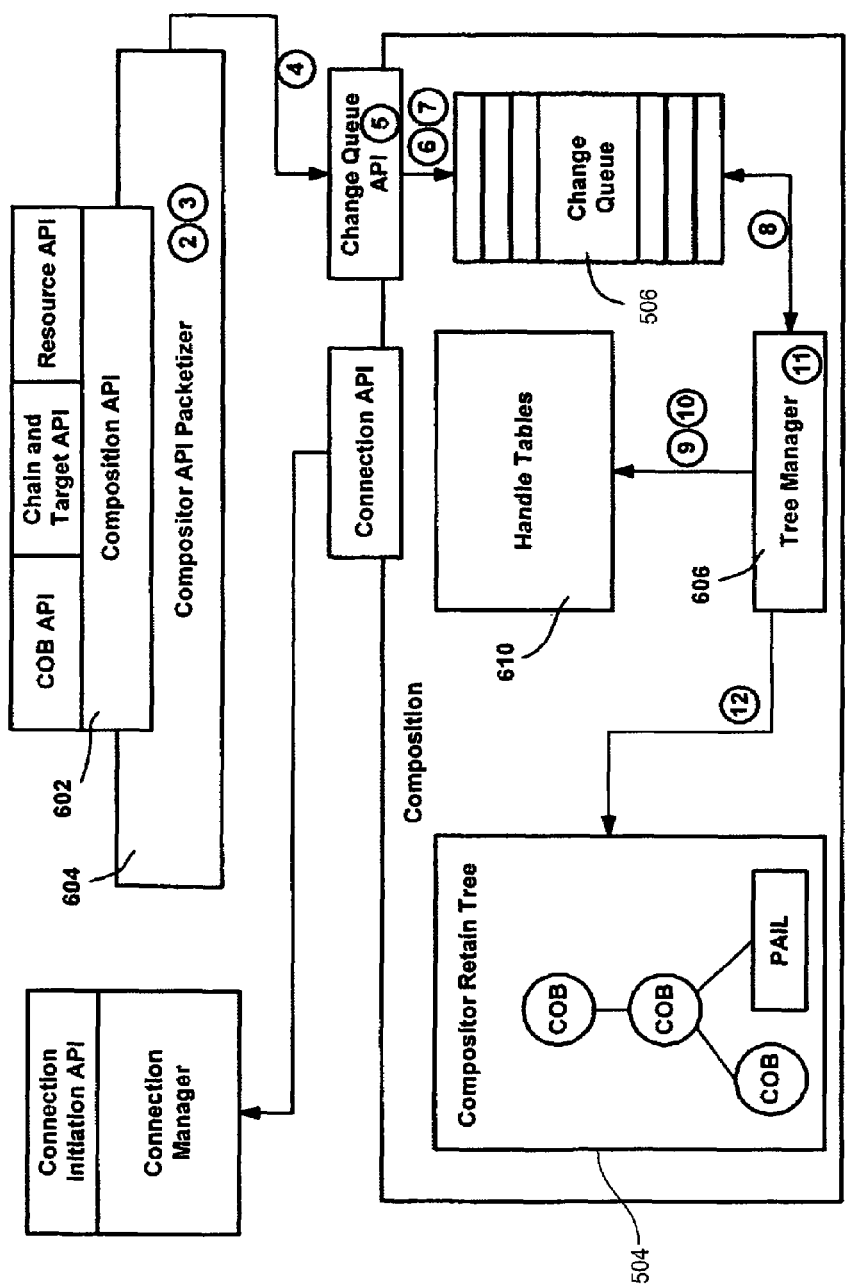
FIG. 6 is a representation of interfaces and components of the compositor in accordance with one aspect of the present invention.

FIG. 6 is a block diagram representing a compositor architecture that uses this approach to provide data to the rendering thread, and from there to the other, decoupled part of the composition mechanism of the compositor 218. The compositor API 602 is exposed by the compositor API packetizer 604. The packetizer 604 builds the packets on the UI thread of the process, and queues the packets in the change queue 506. A tree manager 606 reads the queue, executes the packets and composes the compositor tree 604. Note that when the packets get to the compositor 218, the packets contain pointers to objects that the commands encoded in them act upon.

Packets include compositor object creation packets to communicate the creation of compositable objects, composition target and video player objects, and external object registration packets, which register PAILs for use in the composition tree and Bitmaps and GlyphRuns for use in the PAILs. For use in the local (non-remoted) case, this maps into a NoOp (no operation), since pointers can be used as handles. Other packets include tree structure command packets to effect changes in the composition tree, and attribute packets, which change attributes exposed by the objects that make up the composition tree.

As is understood, the change queue approach works for compositable objects created by the compositor 218. When the compositor is on a remote machine, however, the change queue approach is not sufficient for objects created external to the compositor 218, i.e., objects created by the components using the composition service and handed to the compositor 218. This is because objects (e.g., PAILs, Bitmaps, GlyphRuns) created by the composition users do not exist on the remote machine. To provide remote operation, such objects are instead serialized to the remote machine, and assigned a handle, referred to as registering the object as a resource. The tree structure commands and the PAILs use these handles to address the serialized objects on the remote composition machine.

Figure 7:
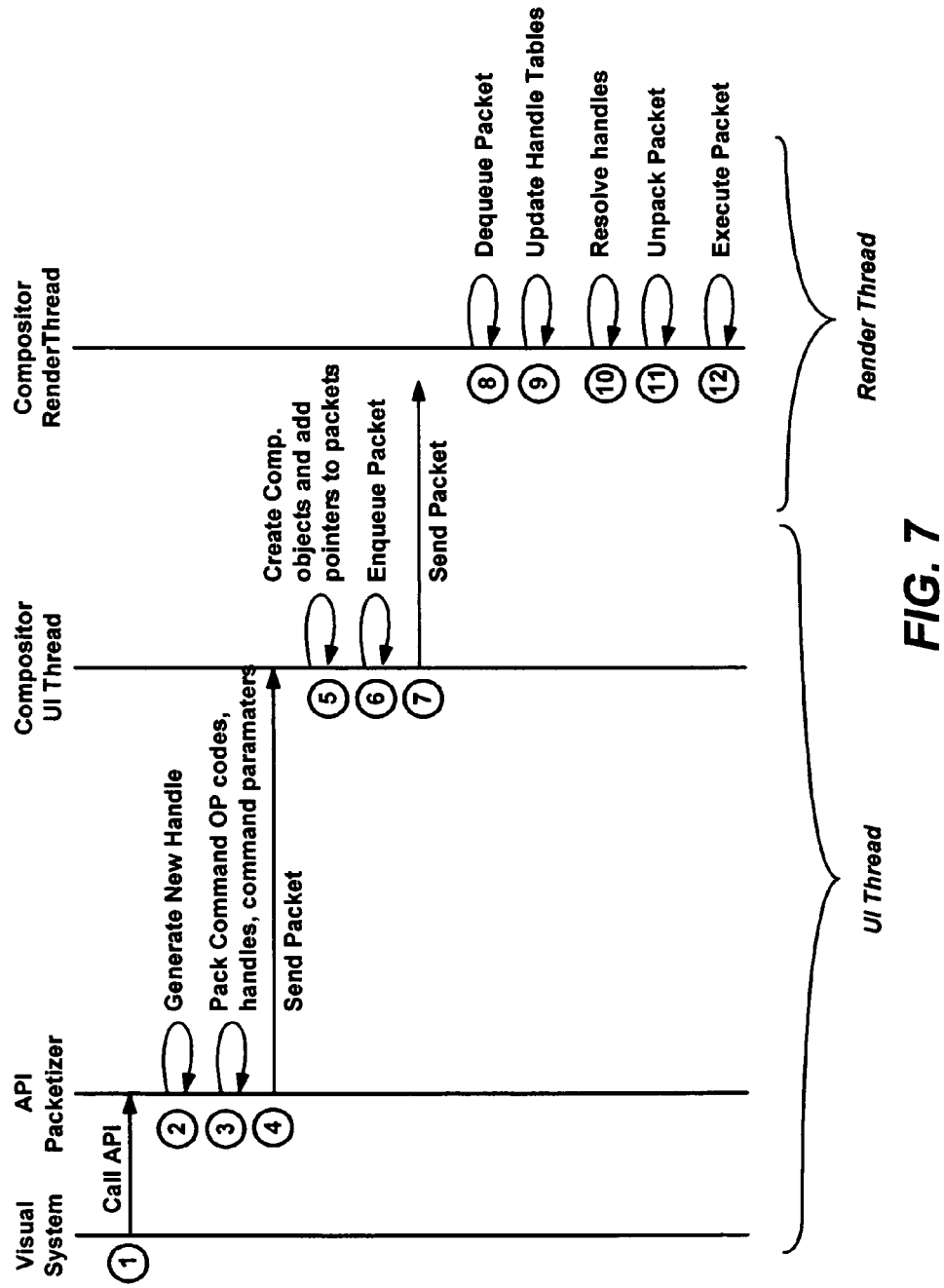
FIG. 7 is a representation of the flow of information packets through the compositor in accordance with one aspect of the present invention.

FIG. 7 depicts a transaction diagram that describes the path the packets take through the different components of the composition architecture. In FIG. 7, the messages in the diagram are numbered in order of occurrence. These numbers also appear in FIG. 6 (starting at number two (2)) as circled numerals, either on the component that executes the message if the message is executed by a component, or on the link between components if it is a message between components. Thus, as represented by circled numeral one (1) in FIG. 7, the described process begins as a call is made into the composition API 602. Note that the messages numbered one (1) through seven (7) are executed on the UI thread, while numbers eight (8) through twelve (12) are executed on the render thread.

As represented by circled numeral two (2) in FIGS. 6 and 7, if this is a create call or a register call, the packetizer 604 allocates new handles. Then, as represented by circled numeral three (3), the packetizer 604 assembles the appropriate packet, and the packetizer 604 sends the packet to the change queue 506 (circled numeral four (4)). Note that in a remote machine case, this is where the machine boundary is, and the UI thread is replaced on the remote machine as a thread that reads the packet communication channel and queues packets in the change queue.

As represented by circled numeral five (5), for packets that create compositor-owned objects, the objects are created, and pointers to them are appended to the packet. In the remote machine case, external objects are read from the registration packets and instantiated on the remote machine. Pointers to the newly created objects are appended to the packets. For the server machine, the UI thread is the thread reading the communication channel.

The packets are then queued by the UI thread into the change queue 506, as represented by circled numeral six (6), and the packet is effectively sent to the rendered thread, by signaling the render thread that packets are available for processing (circled numeral seven (7)) by the render thread.

The processing of the packet by the code executing on the render thread is represented by circled numerals eight (8) through twelve (12), and includes dequeuing the packet from the change queue 506 (circled numeral 8), and updating handle tables 610 (circled numeral 9). To update the handle tables 610, for packets that create compositor created objects and for registration packets, the render thread associates handles with object pointers in the handle tables 610. For packets that have unresolved handles, the handles are resolved to object pointers using the handle tables 610 (circled numeral 10).

As represented by circled numeral eleven (11), the render thread then unpacks the packets, which at this stage contain handles resolved to object pointers. The packet commands are then executed on the render thread, as represented by circled numeral twelve (12).

Figure 8:
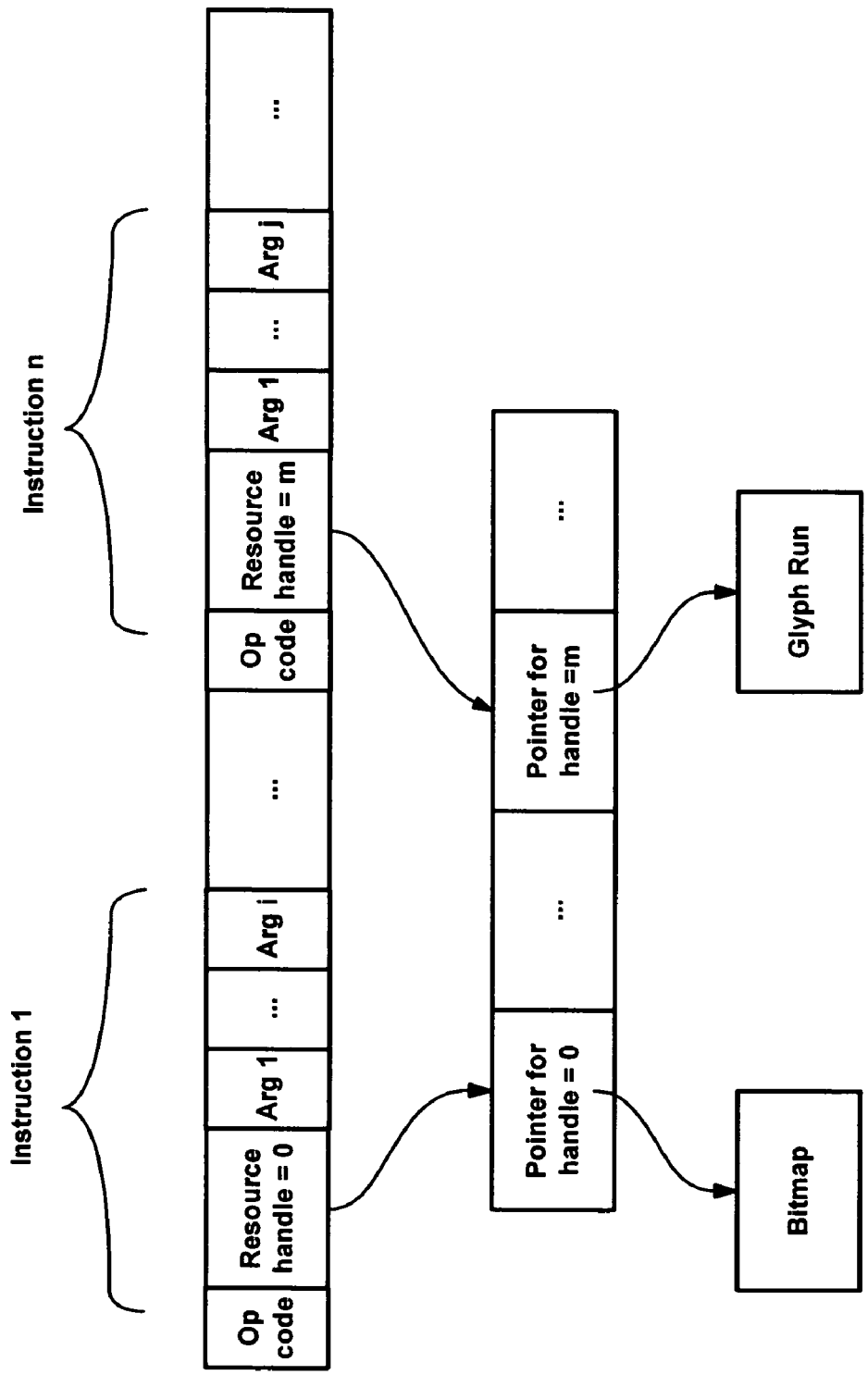
FIG. 8 is a representation of data structures comprising instructions and resource tables in accordance with one aspect of the present invention.

PAILS include a local table that maps handles to object pointers. These handles have scope that is local to the PAIL. FIG. 8 shows a block diagram of a PAIL with its resource table. PAIL handles are translated to compositor handles, which can be accomplished by serializing and registering the objects with the compositor and using the compositor handles in the PAIL (instead off using the local PAIL handles immediately), as is similarly done for compositable objects and video players. Alternatively, when the PAIL is handed to the compositor, a pass is made through the pointer table, the objects are serialized and registered with the compositor, and the object pointers replaced with the newly obtained compositor handles.

Figure 9:
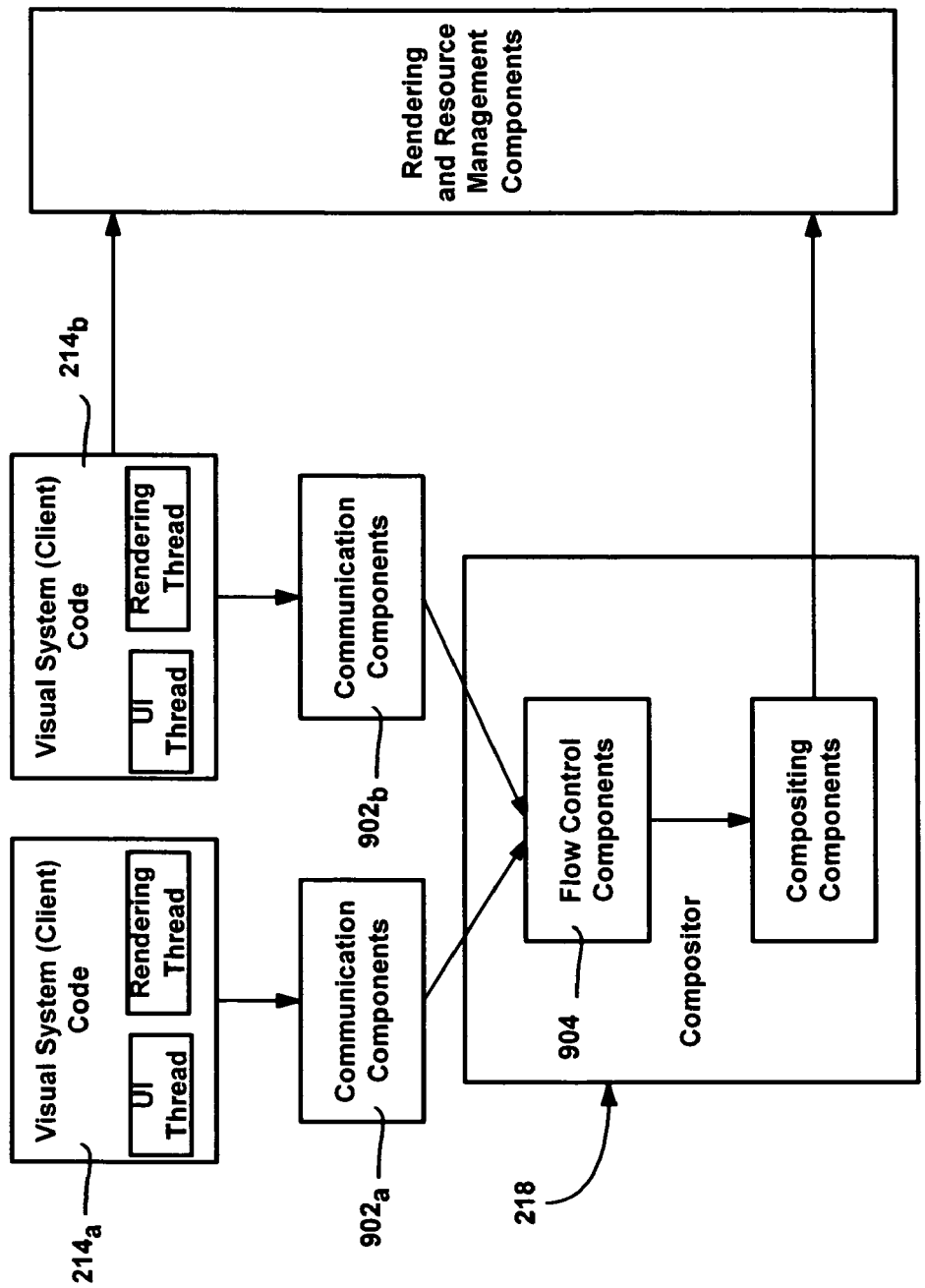
FIG. 9 is a block diagram representing visual systems connecting with components of a compositor in accordance with one aspect of the present invention.

Turning to an architectural overview of the composition service, FIG. 9 provides a general representation of communication between the visual system (client) code $214_a$ and $214_b$ and components of the compositor 218. Note that for many reasons including security, the compositor components will only communicate with valid visual systems, which may be enforced via a strict connection protocol. As described above, and represented in FIG. 9, composition is performed by a local composition service thread, for visual systems that share a common rendering device. Flow control is generally tuned for this architecture, e.g., downstream and upstream communication flow has been designed using visual systems that share a common rendering device as the primary scenario. However, remote rendering and composition is also permitted, in which an application program runs on a remote server, but renders and animates using the local client resources. Note that decoupling the notion of a desktop from the remoting mechanism also permits per-application remoting. Client process composition is also feasible via the compositor code (rendering thread) running inside of the same process space in the client visual system as the UI thread. Clients choosing to cache composed, rasterized representations have visual parity with their representations as rasterized and composed in the service process, which may also apply for pixel effects and printing.

FIG. 9 represents the high-level functional relationships between each of the compositor component families and their peers. As is shown, the communication components $902_a$ and $902_b$ manage the communication between the UI and render threads in the process, while the flow control components 904 mediate between multiple clients and the compositor 218. The composition process is thus decoupled into the visual system-level tree composition thread in the visual system process and low-level desktop compositor components that run in own process, and are tuned for simple interpolation and fast rendering.

Communication components mediate the relationship between visual system clients and the compositor, e.g., by implementing the change queue and appropriate communications protocol. The nature of the channel (whether local, remote, or in-process) is mostly transparent to the client code at the client API level. The communication components handle the various complexities of cross-thread or remote machine communication, requiring minimal specialization from the client. The communication components maintain the connection and channel, manage the queues of incoming media instruction blocks, and convey throttling or error information back to the clients.

Flow control components manage the incoming instruction flow into the composition tree, that is, they handle the many-client-to-one rendering relationship, including balancing resources and managing the update frequency across the clients. The flow control components 904 may return feedback (e.g., errors) from the composition components for use by the client code. Additionally, the flow control components may prioritize and reorder the compositable objects inside of the composition trees.

Rendering and resource management components mediate the relationship between the compositor and the renderers, whether device-dependent or device-independent. They provide a canonical view of the cross-section of rendering capabilities, and provide software failover when necessary. The rendering services allow clients to select the type of output they can best use, whether rendering media instruction blocks (processed directly by a low-level renderer), or a bitmap.

Composition tree components maintain the list of compositable objects, perform interpolation of animated primitive parameters, and call the renderers to draw to the destination (the back-buffer or a client-supplied surface). These components are performance-critical, and in general, perform a narrowly-focused set of tasks.

Figure 10:
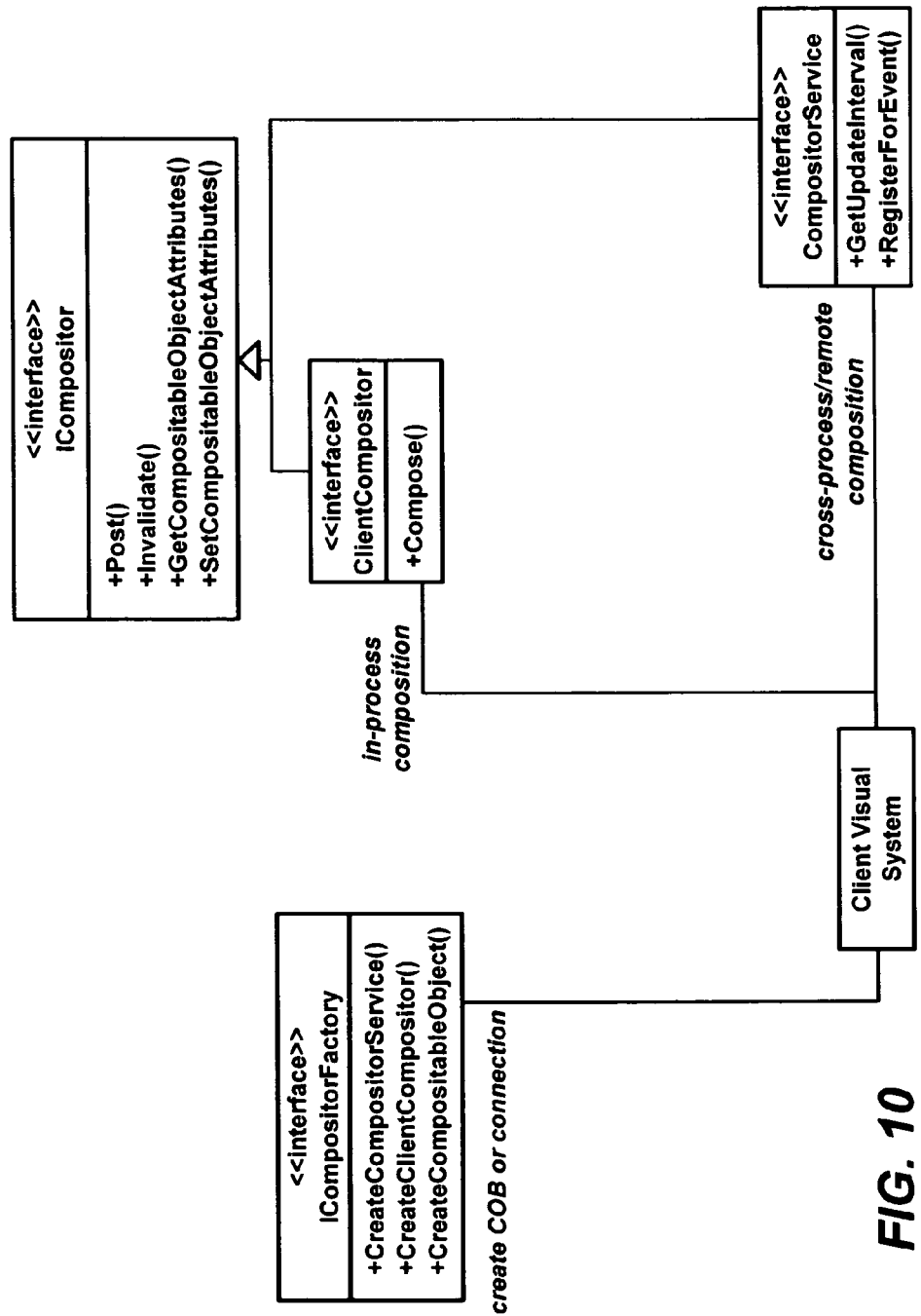
FIG. 10 is a block diagram representing interface for visual system (client) interaction with a compositor in accordance with one aspect of the present invention.

As represented in FIG. 10, visual system clients interact with the decoupled composition service in different ways, including via factories, and compositor interfaces. Communication between the visual system clients and the compositor is designed to be asynchronous and primarily downstream. Rendering instructions will flow downstream from the clients, with intermittent advisory or error information going upstream. Downstream communication is queued, while upstream communication is not, to attempt to maximize the downstream capacity so that a large proportion of the communication channel is allocated to the flow of rendering instructions. Further, the type of upstream communication may be limited to error messages and aggregate statistical information (e.g., frame rate), because this limited form of upstream communication can be accomplished without imposing lock semantics on the composition thread. Information may be made available to the visual system clients in the form of event handles, or via lightweight procedure call.

Clients create connections and compositable components via the factory API. As described above, clients explicitly create compositors as an in-process service, and thus do not need the notion of an update interval, because for in-process, the composition pass occurs immediately in response to a compose call (with the client furnishing a destination surface).

The compositor factory interface permits clients to create an in-process connection to the compositor. The composition may occur inside the client's process, on a different process, or on a different machine. Once the client creates the connection, the programming interfaces are the same or very similar. Clients also use the factories to create compositable objects, as described above. Typically, clients will simply create and use a single service connection. Compositable objects creation is likely to be frequent at startup, with some modicum of construction occurring afterwards.

Clients use the compositor interfaces to interact with the per-client media instruction block queues, and the compositor's flow control mechanisms. Methods are provided for simple enqueuing, queue management, error detection, frame-rate prediction, and composition service event subscription. The compositor interfaces are primarily media instruction block pipes for the client. In the general case, the client also has the flexibility to invalidate media instruction blocks currently stored in the composition tree, as well as those currently queued and waiting to transition into the composition tree. Note that invalidating does not affect a compositable object's lifetime, but rather flushes out the compositable object's list of constituent media instruction blocks.

The client visual system performs operations on compositable object attributes (e.g., including origin, extent, transform, opacity, blend mode, clip region, and hit region), via the compositor service. The attribute changes are sent to the compositor as these calls are made, where they are processed in order, but potentially asynchronously.

Figure 11:
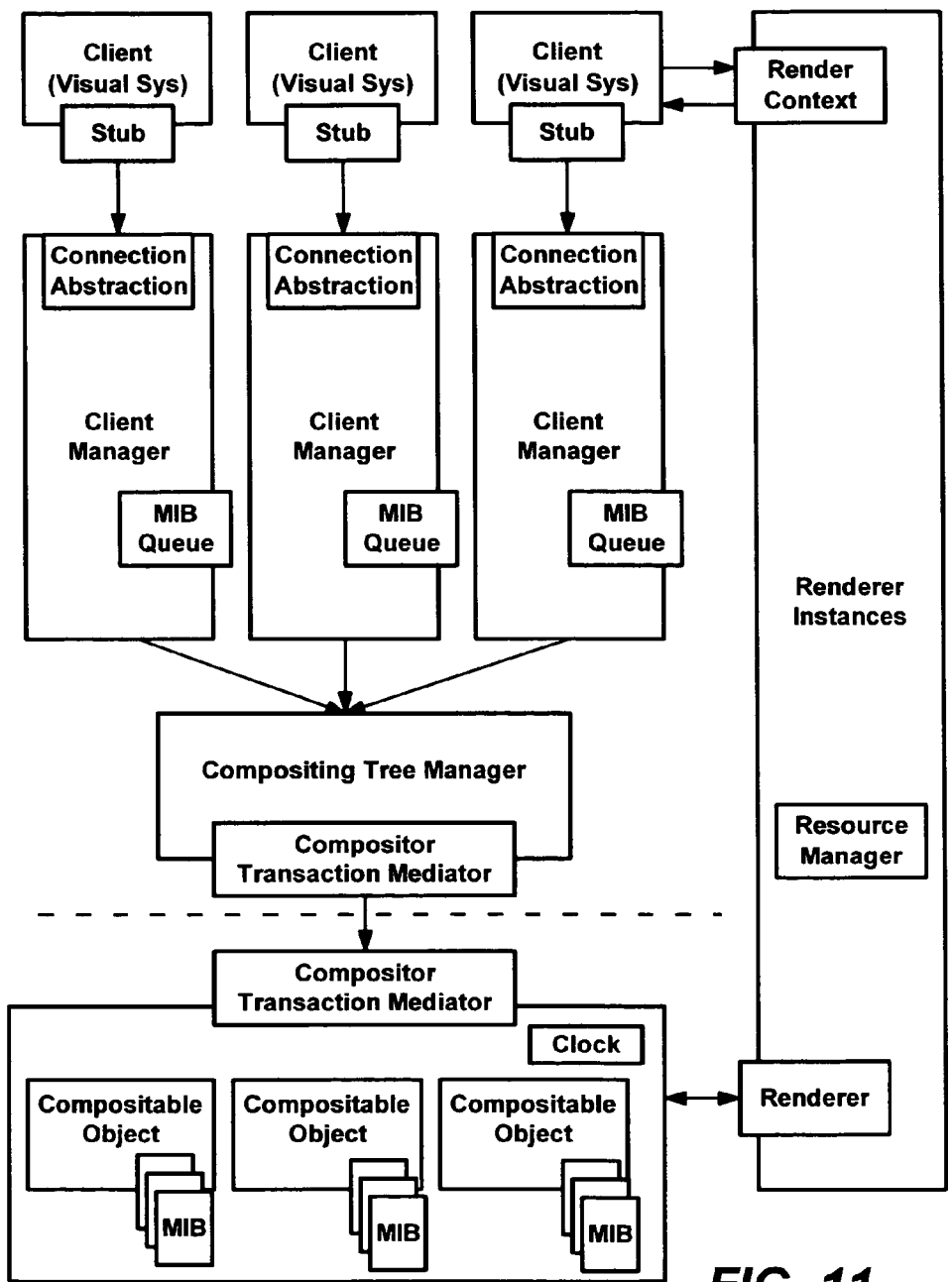
FIG. 11 is a block diagram representing various components of a compositor in accordance with one aspect of the present invention.

FIG. 11 illustrates a fundamental example topology of the decoupled composition service, as it exists for a local (non-remote) rendering service. Essentially, the desktop composition engine contains only a double-buffered visual structure (flip tree) for each application, (not including the necessary non-client area content storage). The essence of the queuing model lives inside the application process, but does not cross the process boundary. The lower-level desktop composition representation may or may not utilize instruction lists to perform the final composition to the display device's back buffer. Rather, each client visual system may present its composed content to the backbuffer maintained for each application inside of the desktop composition engine.

Desktop composition occurs in a service process, shared by the clients using a common rendering device (i.e. display adapter). In the example of FIG. 11, each client represents its own process, which has a UI thread and a rendering thread, as described above. In this manner, overall rendering performance is properly biased according to relative client priority and content demand, e.g., centralizing composition of graphics and media content into a single service allows smooth frame rates among clients, and accord foreground applications more video memory than background applications. Further, clients with richer content and requiring a higher degree of user interactivity receive greater benefit. A notification system allows clients to tailor content to foreground and background scenarios accordingly.

In general, the rendering instances link into each process, and share little if any state across process boundaries. Rendering instances generate media instruction blocks (with varying level of device specificity, according to the device capabilities). Rendering requests stream into the service via the client manager objects in the form of media instruction blocks. The media instruction blocks may contain references to resources such as bitmaps, brushes, or pens. Instructions may also contain time values and interval used to animate rendering parameters. Client managers queue the media instruction blocks as they arrive across the communication channel.

The compositing tree manager regulates rendering instruction flow among the clients. It then transacts the media instruction blocks into the composition tree according to priority, and with minimal disruption to the composition loop. Although most communication occurs downstream (from the client visual system to the compositor), there is a feedback channel available for the clients to receive error messages. Other information, such as to enable the client to determine relative quality of service, subscribe for events from the compositor, and asynchronously query for rendering state, are feasible, but may not be implemented so as to facilitate significantly more downstream communication that upstream communication. Depending on the amount of feedback permitted, the feedback channel may allow clients the flexibility to provide freshly rasterized version of a set of primitives when the previous version has been scaled or rotated to the point that visual artifacts would become apparent. Such feedback may also allow clients to re-render for different target representations according to changing system resource conditions.

Clients may choose to pre-render and composite content for caching purposes. This content may then be sent to a compositor server, or saved to a file as an image. One reason the client may choose to cache a composed frame of static content is to minimize processing time for expensive rendering data. It is possible that a client may determine that it will realize better overall performance by pre-composing expensive static content to a destination surface, and then sending this content down to the compositing service as a bitmap resource. If a client submitted this expensive data to a central compositing service, the service might throttle the client back to prevent its interfering with the ability of other clients to produce their frames. When the client can relegate this rendering expense to its own process, other clients will not be penalized, and the client is not subject to potentially aggressive throttling measures.

Clients should view component objects as visual building blocks for new window system constructs. For example, it is likely that a new window system would delegate window management to a process separate from the individual client applications. This has the advantage of allowing a single process to manage themes across clients, as well as support for terminating hung applications. Note that this need not alter the programming model for the window manager, as the application model infrastructure could expose necessary APIs to client code that communicate with the window manager process.

Turning to an explanation of the communication protocol used to communicate between the client visual system and the composition service, in one preferred implementation, communication is asynchronous. Asynchronous communication is essentially required when the client process and composition service reside on different machines. As described above, most communication is from the client visual system to the composition service, that is, the communication is downstream, although some communication (e.g., asynchronous error messages) may be returned on a backchannel. Certain operations, such as to read back an attribute may be allowed, however such a reading back results in round-trip communication. Note that for many other types of requests, the client will not block, however when the client requests an attribute value from the composition service, the client needs to block until it receives the value back from the compositor service.

The distinction between asynchronous communication and client-blocking calls is significant, and even though certain the client calls may block, the underlying communication protocol is not synchronous. Similarly, an asynchronous protocol does not imply that client application calls into the compositor's stub would not block waiting for completion of a round-trip request. Clients should assume that any call to retrieve attribute data from the composition service may round-trip.

As described above, only valid clients can connect to a compositor, and there are specific connect/disconnect semantics for clients which are implemented as blocking calls for the client. A small amount of client information will be supplied for the purposes of data and connection validation, however any necessary authentication and encryption will be handled external to the communications protocol. Note that reconnection to the service following an interruption or diversion of output (as occurs during certain remote execution scenarios) will be modeled as a second connection request.

Beyond maintenance of the connection, clients will interact with the composition service asynchronously, and in a primarily unidirectional fashion, as described above, that is, most information will come from clients into the service. The client views the composition service as including resources, media instruction blocks, compositable objects, compositable groups, composition trees and composition targets, as also described above. The interaction between clients and the composition service relates directly to one or more of these units, and the types of interaction include connection operations include the simple connect/disconnect semantics, registration operations, attribute operations, structural operations, batch operations and update operations.

Registration operations include the means by which data is registered with the composition service. Units of compositable content are registered with the composition service. Items that are created, but referenced by the composition components, (such as resources and media instruction blocks), are explicitly registered. Items created by the composition service (compositable objects, groups, trees, and targets) are implicitly registered when instantiated.

Attribute operations include any writing or reading of composition component attributes. For example, the most common attribute operations are likely to be the retrieval and manipulation of compositable objects attributes. Requests to read and write attribute values transact asynchronously, but when a read request is issued by a client, that client visual system may block. Structural operations include addition, replacement, or deletion of any type of compositable content to or from its parent. Batch operations allow clients to group a set of changes that must be applied to compositable content atomically. Update operations include attribute modification for registered resource content.

FIGS. 12-17 are diagrams that illustrate the client communication activity triggered by the necessary set of client calls, complete with the underlying communication traffic. In FIGS. 12-17, the client application comprises the client (visual system) process code external to the composition service (UI thread), the compositor stub is the composition service code (renderer thread) resident in the client process, and the client manager manages the incoming requests for the composition service, and is present in a composition service process.

Communication between the compositor stub and the client manager is asynchronous, both upstream and downstream, and most communication does not require acknowledgement. Exceptions include connection requests and attribute readback, (in implementations that allow readback). In FIGS. 12-17, the communication from client application to the compositor stub includes one or more functions calls.

Figure 12:
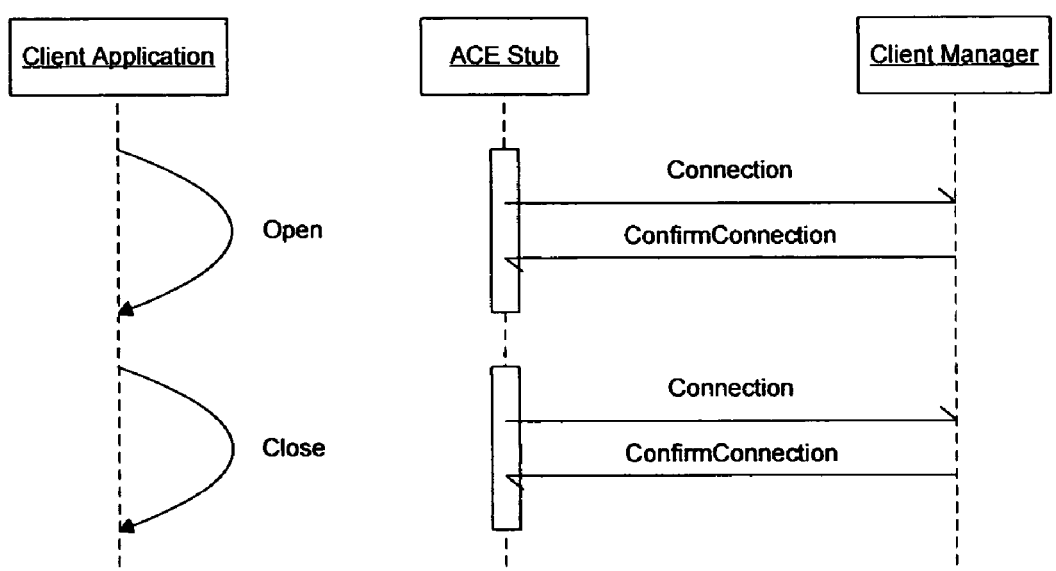
FIG. 12 is a diagram representing a client communicating with the compositor via a communication protocol to compose content in accordance with one aspect of the present invention.

FIG. 12 represents the connect and disconnect communications in a simple sequence from the client application to the desktop composition service. Clients will usually initiate and maintain a single connection for the lifetime of the application, as connecting and disconnecting are relatively expensive operations, communication to the composition service is likely to be frequent, and the cost of maintaining the connection will be much lower than the cost of repeatedly disconnecting and connecting.

As described above, the communication between the client application and the compositor is in the form of function calls, while the communication between the compositor and the client manager is in the form of asynchronous messages, or requests. Subsequent scenarios will presume correct connection/disconnection, so these calls and requests are omitted from their sequence diagrams.

The sequence diagrams detail the expansion of function calls into requests. Note that a Close function call from the client into the compositor is considered a connection request, which encapsulates both Open and Close function calls by providing information to the composition service indicating whether the client is connecting or disconnecting.

As represented in FIG. 12, the connect and disconnect calls into the compositor stub block the client. Most of the compositor stub functions will not block, but given the importance of establishing the communication channel, the client should know whether the request to connect or disconnect succeeds before it proceeds.

Figure 13:
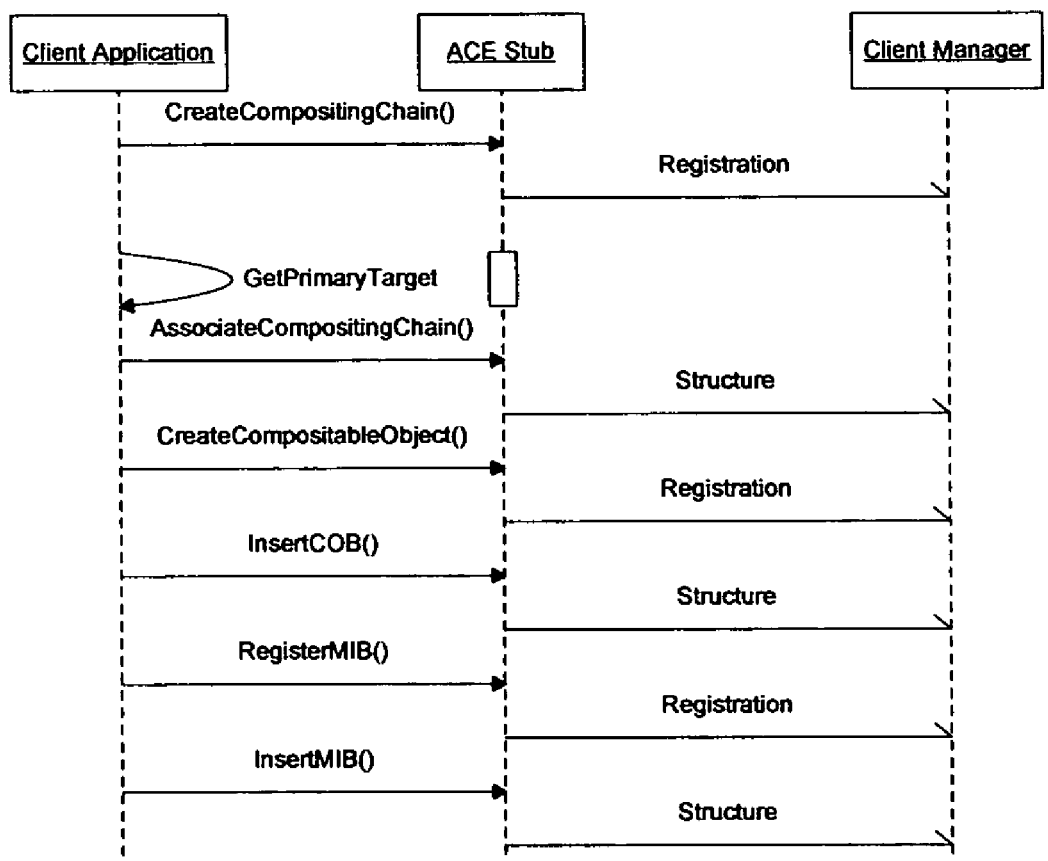
FIG. 13 is a diagram representing a client communicating with the compositor via a communication protocol to change attributes in the compositor tree in accordance with one aspect of the present invention.

Calls related to composition of content are represented in FIG. 13, demonstrating an example scenario in which the client connects to the composition service, renders, and then quickly disconnects from the composition service. As can be seen from FIG. 13, the client creates a composition tree, retrieves the primary composition target from the composition service, associates the composition tree with the primary target, creates a compositable object, adds the COB to the composition tree, and then adds a media instruction block under the compositable object.

In the example of FIG. 13, the client creates the necessary composition service structure and supplies media instruction block content, created by a MILRender method. Note that each MILRender-created item needs to be registered before it is used. Further, note that the call to retrieve the primary target does not result in a request to the composition service. In general, non-mutable components such as the primary target will be locally cached to avoid round-trip requests to the composition service.

Figure 14:
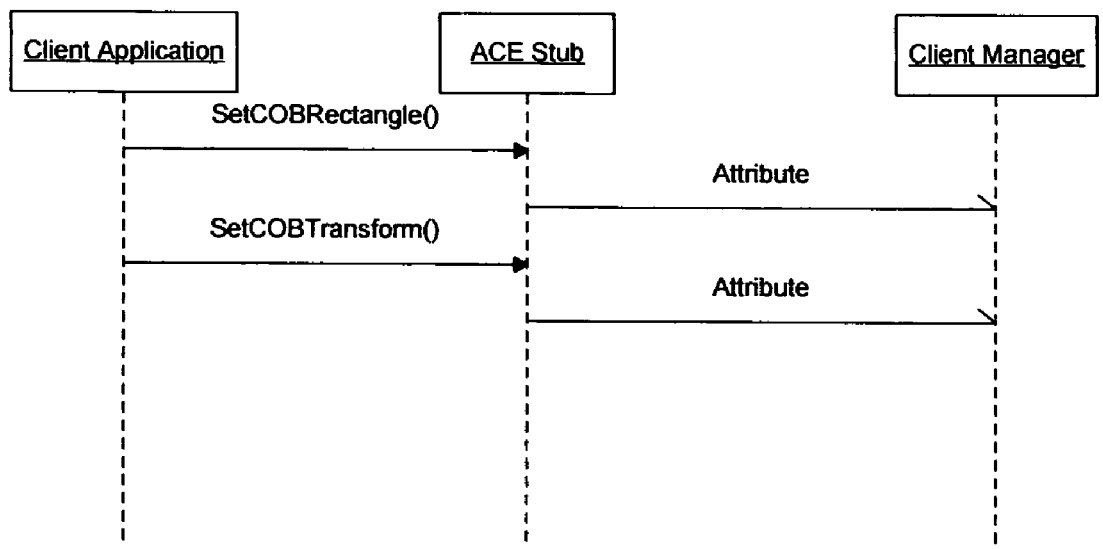
FIG. 14 is a diagram representing a client communicating with the compositor via a communication protocol to connect and disconnect from the compositor in accordance with one aspect of the present invention.

In the example of FIG. 14, the client has created the content as specified in the previous example. Often, clients will wish to change attributes on some of the composited content. FIG. 14 illustrates the example calls and underlying requests that a client would use revise the bounding rectangle and transform for a compositable object. Note that in FIG. 14, the client may have also changed several attributes on several different compositable or groups. In such an event, each change would result in a new attribute request from the compositor stub down to the client manager, with no readback or confirmation necessary.

Figure 15:
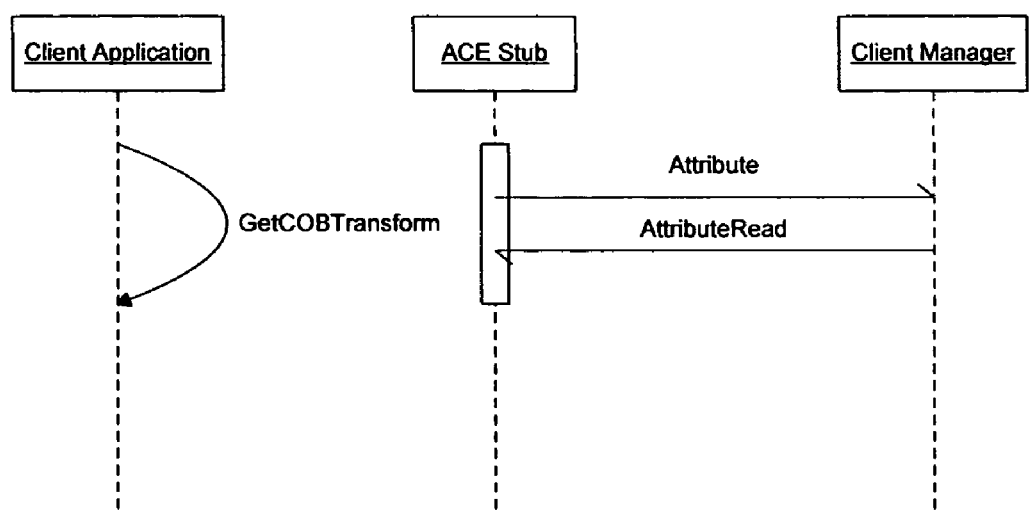
FIG. 15 is a diagram representing a client communicating with the compositor via a communication protocol to read back composition attributes from the compositor in accordance with one aspect of the present invention.

FIG. 15 represents the readback operation to obtain composition attributes. Note that despite the asynchronous communication model, the client may still require a means of reading information back from the composition components. Further, note that readback is not allowed in some implementations.

In FIG. 15, the calls and requests necessary for a client to retrieve the transform associated with a compositable object are shown. To the client application, the function call appears synchronous. Inside of the compositor stub, the client is blocked until both the outgoing and incoming requests have been processed by and from the client manager. This roundtrip is expensive, however it provides a balance between decoupling the client and server (asynchronous communication avoids blocking the composition loop) and getting the most accurate information possible. In the event that the attribute is animating inside of the composition service (as described below), the information that the client is able to obtain via readback will not be precise, but rather as close an approximation as possible. The reason for this is that the animation will occur on a per-frame basis, with a read retrieving the most recently written value (for the previous frame).

Figure 16:
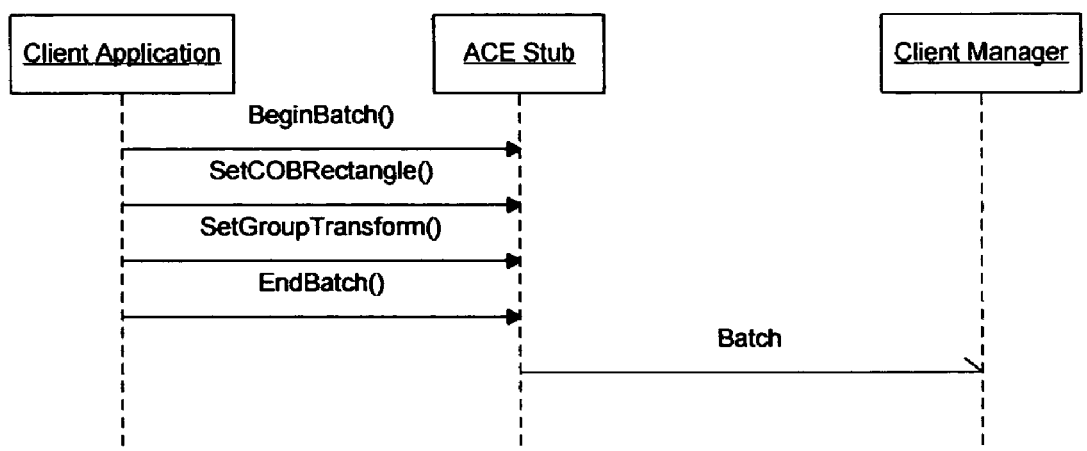
FIG. 16 is a diagram representing a client communicating with the compositor via a communication protocol to batch a number of changes in accordance with one aspect of the present invention.

FIG. 16 represents the concept of batched changes, to handle situations in which clients want to specify that multiple changes apply atomically. This set of changes may include a full range of structural and attribute changes. In the example below, the changes are applied to a compositable object as well as to a group. This group may or may not be parent to the compositable object.

In the example of FIG. 16, the stub retains the notion of "batching" state, and accrues the requests until the client ends the batch. At that point, the stub assembles the accrued requests into a batch request, and sends the batched requests together. The change queue inside of the composition service retains the batching construct so as to ensure that the changes occur atomically. Note that in one implementation, readback is not allowed. If readback is allowed, when a client places a series of readback requests into a batch, the client will block until the readback requests can be satisfied. For the most part, attribute requests are fairly small, so this usually does not translate into a significantly longer wait.

Figure 17:
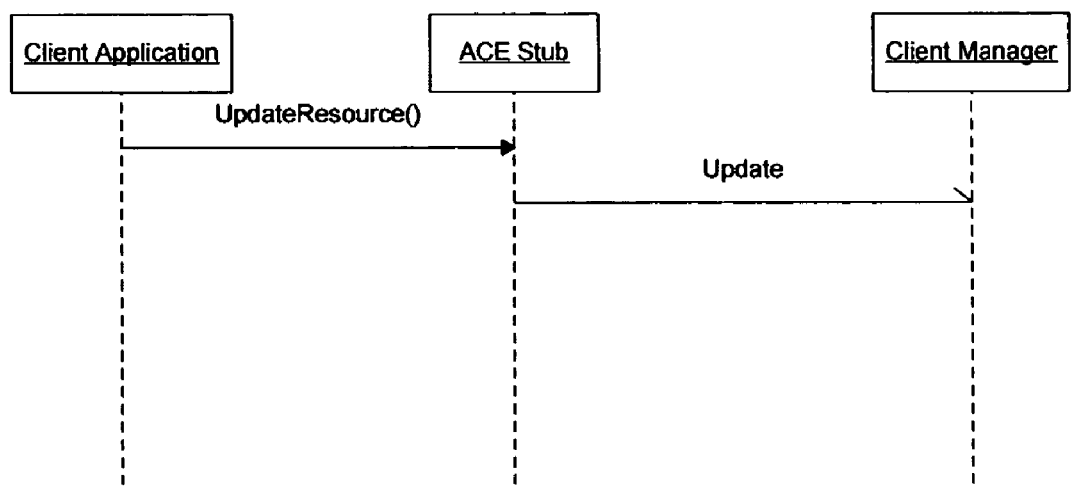
FIG. 17 is a diagram representing a client communicating with the compositor via a communication protocol to update animated content in accordance with one aspect of the present invention.

The updating of animated content is represented in FIG. 17, which supports scalable animation. Note that as described below, animation is a significant part of the user interface. Clients may be allowed to assume complete responsibility for animation, such as when the animation is complex or when the animation target requires that a non-accelerated set of operations (such as tessellation) occurs.

For certain low-cost, high visibility UI effects such as motion animation, these operations occur during a tree's composition pass. In such a case, in one alternative, the client may sample the high-level animation function and provide a series of time-stamped values associated with a resource as a request to the composition service. These represent the intervals over which the resource is to be animated, and the endpoints of the timeline during which the interval remains active. In another alternative, the client provides an animation function and parameters to the compositor, and the compositor changes the compositor tree over time to provide the animation.

Note that FIG. 17 appears relatively straightforward, and it is from the client perspective, but is relatively complex from the client manager's perspective. The client manager normalizes the time-stamped values to the composition service's global timeline, and the compositable object manager plugs the update block into the appropriate media instruction blocks during composition to the target. For each composited frame, the service will evaluate the resource's interval to derive the instantaneous value.

Client application references to composition service components are via handles. This is necessary, as in a remote case, communication between the client and the composition service is potentially marshaled across a low-speed connection medium. For these reasons, a single interface, IComposition-Service, is exposed to address the transactions between the client application and the composition service. The interface is called and obtained by the client via a call to a static factory method. The exposed methods are listed below, according to functional category.

| Connection Methods: |
| --- |
| STDMETHOD(Connect) ( <br> THIS_ <br> ) PURE; <br> STDMETHOD(Disconnect) ( <br> THIS_ <br> ) PURE; |

| Batching Methods: |
| --- |
| STDMETHOD(BeginBatch) ( <br> THIS_ <br> ) PURE; <br> STDMETHOD(EndBatch) ( <br> THIS_ <br> ) PURE; |

| Compositable object Methods: |
| --- |
| STDMETHOD(CreateCOB) ( <br> THIS_ <br> OUT HCOB *phCOB <br> ) PURE; <br> STDMETHOD(DeleteCOB) ( <br> THIS_ |

| Compositable object Methods: |
| --- |
| IN HCOB hCOB<br>) PURE;<br>STDMETHOD(SetCOBRectangle) (<br>  THIS_<br>  IN const HCOB hCOB,<br>  IN const RECTANGLE *prc<br>) PURE;<br>STDMETHOD(GetCOBRectangle) (<br>  THIS_<br>  IN const HCOB hCOB,<br>  OUT RECTANGLE *prc<br>) PURE;<br>STDMETHOD(SetCOBClipRegion) (<br>  THIS_<br>  IN const HCOB hCOB,<br>  IN const HRGN hrgnClip<br>) PURE;<br>STDMETHOD(GetCOBClipRegion) (<br>  THIS_<br>  IN const HCOB hCOB,<br>  OUT HRGN *phrgnClip<br>) PURE;<br>STDMETHOD(SetCOBHitRegion) (<br>  THIS_<br>  IN const HCOB hCOB,<br>  IN const HRGN hrgnHit<br>) PURE;<br>STDMETHOD(GetCOBHitRegion) (<br>  THIS_<br>  IN const HCOB hCOB,<br>  OUT HRGN *phrgnHit<br>) PURE;<br>STDMETHOD(SetCOBTransform) (<br>  THIS_<br>  IN const HCOB hCOB,<br>  IN const MILMatrix *pmatXForm<br>) PURE;<br>STDMETHOD(GetCOBTransform) (<br>  THIS_<br>  IN const HCOB hCOB,<br>  OUT MILMatrix *pmatXForm<br>) PURE;<br>STDMETHOD(SetCOBOpacity) (<br>  THIS_<br>  IN const HCOB hCOB,<br>  IN const FLOAT fltOpacity<br>) PURE;<br>STDMETHOD(GetCOBOpacity) (<br>  THIS_<br>  IN const HCOB hCOB,<br>  OUT FLOAT *pfltOpacity<br>) PURE;<br>STDMETHOD(SetCOBBlendFunction) (<br>  THIS_<br>  IN const HCOB hCOB,<br>  IN const BLENDFUNCTION *pbf<br>) PURE;<br>STDMETHOD(GetCOBBlendFunction) (<br>  THIS_<br>  IN const HCOB hCOB,<br>  OUT BLENDFUNCTION *pbf<br>) PURE;<br>STDMETHOD(GetMIBCount) (<br>  THIS_<br>  IN const HCOB hCOB,<br>  OUT INT *piCount<br>) PURE;<br>STDMETHOD(GetMIBAt) (<br>  THIS_<br>  IN const HCOB hCOB,<br>  IN const INT iPos,<br>  OUT HMIB *phChild<br>) PURE;<br>STDMETHOD(InsertMIBIntoCOB) (<br>  THIS_<br>  IN const HCOB hCOB,<br>  IN const HMIB hChild |

| Compositable object Methods: |
| --- |
| IN const INT iPos<br>) PURE;<br>STDMETHOD(RemoveMIBFrom) (<br>  THIS_<br>  IN const HCOB hCOB,<br>  IN const HMIB hChild<br>) PURE;<br>STDMETHOD(ReplaceMIBInCOB) (<br>  THIS_<br>  IN const HCOB hCOB,<br>  IN const HMIB hOld,<br>  IN const HMIB hNew<br>) PURE; |

| COB Group Methods: |
| --- |
| STDMETHOD(CreateCOBGroup) (<br>  THIS_<br>  OUT HCOB *phCOBGroup<br>) PURE;<br>STDMETHOD(DeleteCOBGroup) (<br>  THIS_<br>  IN HCOB hCOBGroup<br>) PURE;<br>STDMETHOD(SetCOBGroupRectangle) (<br>  THIS_<br>  IN const HCOBGROUP hCOBGroup,<br>  IN const RECTANGLE *prc<br>) PURE;<br>STDMETHOD(GetCOBGroupRectangle) (<br>  THIS_<br>  IN const HCOB hCOB,<br>  OUT RECTANGLE *prc<br>) PURE;<br>STDMETHOD(SetCOBGroupClipRegion) (<br>  THIS_<br>  IN const HCOBGROUP hCOBGroup,<br>  IN const HRGN hrgnClip<br>) PURE;<br>STDMETHOD(GetCOBGroupClipRegion) (<br>  THIS_<br>  IN const HCOBGROUP hCOBGroup,<br>  OUT HRGN *phrgnClip<br>) PURE;<br>STDMETHOD(SetCOBGroupHitRegion) (<br>  THIS_<br>  IN const HCOBGROUP hCOBGroup,<br>  IN const HRGN hrgnHit<br>) PURE;<br>STDMETHOD(GetCOBGroupHitRegion) (<br>  THIS_<br>  IN const HCOBGROUP hCOBGroup,<br>  OUT HRGN *phrgnHit<br>) PURE;<br>STDMETHOD(SetCOBGroupTransform) (<br>  THIS_<br>  IN const HCOBGROUP hCOBGroup,<br>  IN const MILMatrix *pmatXForm<br>) PURE;<br>STDMETHOD(GetCOBGroupTransform) (<br>  THIS_<br>  IN const HCOBGROUP hCOBGroup,<br>  OUT MILMatrix *pmatXForm<br>) PURE;<br>STDMETHOD(SetCOBGroupOpacity) (<br>  THIS_<br>  IN const HCOBGROUP hCOBGroup,<br>  IN const FLOAT fltOpacity<br>) PURE;<br>STDMETHOD(GetCOBGroupOpacity) (<br>  THIS_<br>  IN const HCOBGROUP hCOBGroup, |

| COB Group Methods: |
| --- |

```
        OUT FLOAT *pfltOpacity
        ) PURE;
    STDMETHOD(SetCOBGroupBlendFunction) (
        THIS_
        IN const HCOBGROUP hCOBGroup,
        IN const BLENDFUNCTION *pbf
        ) PURE;
    STDMETHOD(GetCOBGroupBlendFunction) (
        THIS_
        IN const HCOBGROUP hCOBGroup,
        OUT BLENDFUNCTION *pbf
        ) PURE;
    STDMETHOD(GetCOBCount) (
        THIS_
        IN const HCOBGROUP hCOBGroup,
        OUT INT *piCount
        ) PURE;
    STDMETHOD(GetCOBAt) (
        THIS_
        IN const HCOBGROUP hCOBGroup,
        IN const INT iPos,
        OUT HCOB *phChild
        ) PURE;
    STDMETHOD(InsertCOBIntoCOBGroup) (
        THIS_
        IN const HCOBGROUP hCOBGroup,
        IN const HCOB hChild,
        IN const INT iPos
        ) PURE;
    STDMETHOD(RemoveCOBFromCOBGroup) (
        THIS_
        IN const HCOBGROUP hCOBGroup,
        IN const HCOB hChild
        ) PURE;
    STDMETHOD(ReplaceCOBInCOBGroup) (
        THIS_
        IN const HCOBGROUP hCOBGroup,
        IN const HCOB hOld,
        IN const HCOB hNew
        ) PURE;
```

| Composition Tree Methods |
| --- |

```
    STDMETHOD(CreateCompositionTree) (
        THIS_
        OUT HTREE *phTree
        ) PURE;
    STDMETHOD(DeleteCompositionTree) (
        THIS_
        IN HTREE hTree
        ) PURE;
    STDMETHOD(GetTreeChildCount) (
        THIS_
        IN const HTREE hTree,
        OUT INT *piCount
        ) PURE;
    STDMETHOD(GetTreeChildAt) (
        THIS_
        IN const HTREE hTree,
        IN const INT iPos,
        OUT HANDLE *phChild
        ) PURE;
    STDMETHOD(InsertChildIntoTree) (
        THIS_
        IN const HANDLE hChild,
        TN const INT iPos
        ) PURE;
    STDMETHOD(RemoveChildFromTree) (
        THIS_
        IN const HANDLE hChild
        ) PURE;
    STDMETHOD(ReplaceChildInTree) (
        THIS_
        IN const HANDLE hOld,
        IN const HANDLE hNew
        ) PURE;
```

| Composition Target Methods: |
| --- |

```
    STDMETHOD(CreateCompositionTarget) (
        THIS_
        OUT HCOMPTARGET *phTaget
        ) PURE;
    STDMETHOD(DeleteCompositionTarget) (
        THIS_
        IN HCOMPTARGET hTarget
        ) PURE;
    STDMETHOD(GetPrimaryCompositionTarget) (
        THIS_
        OUT HCOMPTARGET *phTarget
        ) PURE;
    STDMETHOD(AssociateTreeWithTarget)(
        THIS_
        IN const HCOMPTARGET hTarget,
        IN const HCOMPTREE hTree
        ) PURE;
```

| Registration Methods: |
| --- |

```
    STDMETHOD(RegisterMIB) (
        THIS_
        IN const HMIB hMIB
        ) PURE;
    STDMETHOD(UnregisterMIB) (
        THIS_
        IN const HMIB hMIB
        ) PURE;
    STDMETHOD(RegisterResource) (
        THIS_
        IN const HRESOURCE hResource
        ) PURE;
    STDMETHOD(UnregisterResource) (
        THIS_
        IN const HRESOURCE hResource
        ) PURE;
```

| Resource Update Methods: |
| --- |

```
    STDMETHOD(UpdateResource) (
        THIS_
        IN const HRESOURCE hResource,
        IN const HRUB hUpdateBlock
        ) PURE;
```

The communication between the client process and the composition service takes the form of block-transfer. Inside of the client process, the compositor stub accumulates the necessary information before sending. The implementation may model the actual transfer as a stream, but the logic governing the sending and receiving will view the transfer as atomic.

For example, if a remote client registers a large image resource, the client manager's proxy object knows by looking at the fixed-size header how much data to expect. The proxy may employ a stream-like interface to perform the reads from the communication channel. The proxy will not deliver the incoming register request to the client manager until the data has arrived on the client machine.

Another example is a batch request. When the client batches a set of requests, these requests accrue into the larger batch request. In other words, the proxy does not deliver any of the requests contained inside of the batch, until the contained requests have arrived.

Protocol requests are preceded by a common header, indicating request size, request type, and client ID:

| | |
|---|---|
| Request Size | Size in bytes of this request |
| Request Type | One of the following constants:<br>CONNECTION<br>REGISTRATION<br>ATTRIBUTE<br>STRUCTURE<br>BATCH<br>UPDATE |
| Client ID | A client's unique identifier. May be used to verify that requests always arrive from the same process and thread. |

| Connection Requests | |
|---|---|
| Connection Request Subtype | One of the following constants:<br>CONNECT<br>DISCONNECT |

| Registration Requests | |
|---|---|
| Registration Request Subtype | One of the following constants:<br>REGISTER<br>UNREGISTER |
| Item type | One of the following constants:<br>RESOURCE_IMAGE<br>RESOURCE_BRUSH<br>RESOURCE_PEN<br>RESOURCE_VIDEO<br>RESOURCE_TRANSFORM<br>RESOURCE_PATH<br>MIB<br>COB<br>GROUP<br>TREE<br>TARGET |
| Item Handle | The client item's handle |
| Item Data Size | Size in bytes of the registered item data. This is zero for an UNREGISTER request |
| Item Data | A variably-sized block of data encompassing data and its structural description (i.e. image bits as well as resolution) |

| Attribute Requests | |
|---|---|
| Attribute Request Subtype | One of the following constants:<br>SET<br>GET |
| Attribute Owner Handle | The handle for the item described by the attribute. |
| Attribute Name | One of the following constants:<br>COB_RECTANGLE<br>COB_TRANSFORM<br>COB_CLIP |

| Attribute Requests | |
|---|---|
| | COB_HIT<br>COB_ALPHA<br>COB_BLENDMODE<br>COB_MIBCOUNT<br>COB_MIB_AT<br>GROUP_RECTANGLE<br>GROUP_TRANSFORM<br>GROUP_CLIP<br>GROUP_HIT<br>GROUP_ALPHA<br>GROUP_BLENDMODE<br>GROUP_COBCOUNT<br>GROUP_COB_AT<br>TREE_CHILDCOUNT<br>TREE_CHILD_AT |
| Attribute Data Size | Size in bytes of the attribute data. For readback requests, (if readback is permitted), this will be zero. |
| Attribute Data | A variably-sized block of data |

| Structural Requests | |
|---|---|
| Structural Request Subtype | One of the following constants:<br>COB_INSERT_MIB<br>COB_DELETE_MIB<br>COB_REPLACE_MIB<br>GROUP_INSERT_COB<br>GROUP_DELETE_COB<br>GROUP_REPLACE_COB<br>TREE_INSERT_COB<br>TREE_DELETE_COB<br>TREE_REPLACE_COB<br>TREE_INSERT_GROUP<br>TREE_DELETE_GROUP<br>TREE_REPLACE_GROUP<br>TARGET_ASSOCIATE_TREE |
| Parent Handle | The handle for the parent whose structure is being updated. |
| First Child Handle | The handle for the first child in the request. Insertion and deletion require only one child. |
| Second Child Handle | The handle for the second child in a replace request. |
| Location value | The index for an insertion request. For an append operation the APPEND constant will be supplied. For non-insertion operation, this will be zero. |

| Batch Requests | |
|---|---|
| Batched request count | Count of the batched requests |
| Batched request data | Batched request data appears sequentially. |

| Update Requests | |
|---|---|
| Resource Handle | Handle to the updated resource |
| Data value size | Size in bytes of a single value (not including the associated timestamp) |
| Value count | Count of the total number of values |
| Timestamp/Value tuples follow in sequence | |
| Timestamp | Client-relative timestamp when a specified value should apply |
| Value | The data value |

Animation

The animation system includes two main components, comprising a timing control engine and a set of animation objects. The timing engine is a service that can be used by any object that exhibits time-varying behaviors, for example, animations and audio or video media objects. The animation objects implement a set of functions that map time spans into other data types, which are then plugged into the inputs of other higher-level objects.

Graphical animation is achieved by specifying an animation object rather than a scalar as an input into a rendering operation. For example, the IDrawingContext.DrawLine method takes a pen and two end points. One of the end points may be a scalar value, but the other may be a PointAnimation object. Similarly, the pen may have a scalar color, but it might also have an associated ColorAnimation. In such an event, each animation used in a rendering operation may be run on a separate clock referred to as a "timeline." Once an animated primitive is drawn, the rendering system takes care of redrawing the scene at regular intervals. To this end, each time a frame is rendered, the current values of animations involved in the scene are computed, based on the elapsed time (in most cases measured by the system clock), and then the animated primitives are redrawn. Note that it is feasible to use something other than time to change an animation's values, e.g., change a current value when an animation gets to a certain position, achieves a certain size, or some other determinable criteria.

Timing attributes comprise a set of parameters that defines the time behavior of an object. Timing attributes are exclusively descriptive and have no run-time state. In addition, timing attributes are immutable. A timeline comprises an instance of a timing entity that maintains a run-time state according to a set of timing attributes. A timeline defines the concept of the current state for a timed object. A timing tree comprises a data structure containing set of timelines arranged in a hierarchical fashion. The relationship between the timelines is defined by a set of inheritance rules and by the timing attributes associated with each timeline.

A timed object is any object that exhibits a time-varying behavior. The description of the time behavior of a timed object is specified by a set of timing attributes, whereas its run-time timing state is maintained by a timeline. An animation function is a function that takes a time value as an input and produces a value of a particular data type and in a particular range as its output. An animated value is any value that varies with time or similar varying criteria. The description of an animated value includes a set of timing attributes and an animation function. In the timing model, timed objects participate in a hierarchical timing system where individual timelines have attributes that define their behavior relative to their parent timeline, or, for top-level timelines, relative to a root "document" (or "page", or "frame") timeline.

Timelines control time-varying processes, such as the playback of a video clip or an animation. The times specified in the attributes of a timeline are relative to something, e.g., in most cases they are relative to a parent timeline, but for timelines at the root of the tree, the values are relative to "document time," which is an implicit timeline that starts when an application is launched, or when a page or frame is navigated. The clock in a timeline is exposed as an offset from the begin point, or as a progress ratio between zero and 1. The latter is simply the ratio of the current time to the duration.

A simple timeline includes a begin time and a duration. For example, a timeline with a begin time of three seconds and a duration of 5 seconds "begins" three seconds after the reference t=0 time (by default, the moment application is loaded), and "ends" five seconds later. During those five seconds the timeline is said to be "on". If this timeline controls an animation, that animation is updated so as to be moving during that time, but is static before and after that time.

A timeline can also be programmed to repeat its behavior. This repeat can be specified as an iteration count, or a repeat duration. In either case, the timeline goes through as many begin to end runs as necessary to fill the requested count or duration. If the repeat count is not an integer value, the last iteration is interrupted in the middle.

The begin time for a timeline is normally relative to its parent timeline (or to document time), but a begin time may also be specified relative to another timeline's begin or end. In that case, every begin (or end) in the source timeline causes a corresponding begin to be scheduled for the target timeline.

When a timeline reaches the end point it is immediately turned to an "off" state. At that time, the timed object that the timeline controls ceases to have an effect on the presentation. For example, if the timed object is an animation, then when the controlling timeline reaches the end point, the animation is removed, i.e., it reverts back to its base value. There are cases, however, where it is desirable to have the final steady state of an animation be frozen at the last value. In other words, the timeline progresses from zero to one between the begin and end points, but after the end point it remains "on" with a progress of 1. This is referred to as a "fill" behavior. Fill=Freeze From the perspective of a timeline, time flows linearly from a progress value of zero to a progress value of 1. However, the relationship between the passage of time inside a timeline and inside its parent can be altered from the default direct correlation, in that time may be reversed in a timeline so that it appears to flow backwards, the rate at which time passes may be sped up or slowed down by a multiplicative factor, and/or the progress curve may be morphed so that instead of progressing linearly from zero to one it accelerates from a standstill at the begin point to a maximum rate of progress, and then decelerates towards a standstill at the end point. This produces an "ease-in, ease-out" effect for any animations controlled by such a timeline.

One straightforward time manipulation involves programming a timeline to go from a progress value of zero to one and then back to zero, e.g., by setting an automatic reverse variable to true. Note that the timeline is active for twice the specified duration, once for the "forward" part and once again for the "backwards" part.

The apparent passage of time for a timeline can be faster or slower than that for its parent, by a constant factor. By default this factor is 1, which means that time in a timeline and its parent passes at the same rate. If this value is greater than one, then the time for the timeline progresses at a faster rate than for its parent. For example, a factor of three makes the timeline travel between the begin and end points three times faster than the specified duration.

Conversely, if the factor is a fractional value between zero and one, then time passes at a slower rate. If the factor is negative then time in the timeline appears to move backwards relative to its parent. Note that the begin time itself is an offset always in the frame of reference of that parent timeline. As a result, while the duration of the timeline is affected by the speed factor, the begin time is not.

The progress/time curve is linear by default. When this linear curve is used to control certain animations, the user may perceive a jerky behavior at the begin and end points, because the animation starts and ends suddenly. To avoid such abrupt behavior, a timeline may be programmed to accelerate the passage of time from a standstill to a maximum rate using a smooth acceleration curve. Similarly, time may be programmed to decelerate towards zero near the end point. The acceleration and deceleration effects are specified as the percentage of the duration spent in the acceleration or deceleration phases. The two values are positive, and their sum does not exceed 1.

The following table includes a list of timing attributes and their meanings:

| Attribute | Type | Meaning |
|---|---|---|
| Acceleration | Float | A value between 0 and 1 representing the fraction of the simple duration spent in the time acceleration phase. The sum of this attribute and the Deceleration attribute may not exceed 1. |
| AutoReverse | Bool | If this attribute is "True" then the timeline progresses from beginning to end and then immediately progresses backwards from end to beginning. In that case, the timeline will be active for twice the amount of time specified by the Duration attribute. |
| Begin | TimeSyncValue | The time at which this timeline should begin. By default this time is relative to the parent timeline's begin time, but the offset may also be specified to be relative to some other timeline's begin or end time. In the latter case, the other timeline must be parented to the same timeline as this one. |
| Deceleration | Float | A value between 0 and 1 representing the fraction of the simple duration spent in the time deceleration phase. The sum of this attribute and the Acceleration attribute may not exceed 1. |
| Duration | Time | The duration of a single period from begin to end. |
| End | TimeSyncValue | The maximum end time for this timeline. If this value is less than the sum of the Begin and Duration properties, then the activation period is cut short by this attribute. In addition, begins (scheduled or interactive) past the time specified by this attribute are ignored. |
| EndSync | TimeEndSync | This attribute is used to define the implicit duration of a timeline, which is used if the Duration attribute is not set explicitly. The implicit duration of a timeline may be defined by the timed object that it controls or by other timelines that may be parented to it. |
| Fill | TimeFill | The behavior of the timeline after the end time passes. By default, the timeline is only "on" from begin to end, but if this attribute is set to "Freeze" then the timeline remains on past the end time. In that case, the progress value after the end time is equal to whatever it was at the end time. The possible values are Remove (the global default), Freeze, Hold, Transition and Auto. |
| FillDefault | TimeFill | The default value for the Fill attribute. If the Fill attribute is not specified then this attribute is used to determine the fill behavior. In addition, this default is inherited by timelines parented to this one, unless they have their own FillDefault attribute set. The possible values are the same as for the Fill attribute. |
| RepeatCount | Float | The number of times a begin to end period should be repeated. This may be a fractional value, as well as the special value float.PositiveInfinity to indicate that the timeline should repeat forever. If both this attribute and the RepeatDuration attribute are specified, the total active duration is the minimum of the two. |
| RepeatDuration | Time | The length of time for which a begin to end period should be repeated. This may imply a fractional repeat count, or it may be the |

-continued

| Attribute | Type | Meaning |
|---|---|---|
| | | special value Time.Indefinite to indicate that the timeline should repeat forever. If both this attribute and the RepeatCount attribute are specified, the total active duration is the minimum of the two. |
| Restart | TimeRestart | The behavior of the timeline when a second (or later) begin time is reached. By default, a begin time interrupts any active period and goes back to time t = 0 for the timeline, but if this attribute is set to WhenNotActive then a begin time that would interrupt an active period is ignored. The possible values are Always, WhenNotActive and Never. |
| RestartDefault | TimeRestart | The default value for the Restart attribute. If the Restart attribute is not specified then this attribute is used to determine the restart behavior. In addition, this default is inherited by timelines parented to this one, unless they have their own RestartDefault attribute set. The possible values are the same as for the Restart attribute. |
| Speed | Float | The relative speed at which time should pass for this timeline, compared to its parent timeline. E.g., A value of 1 means normal speed, whereas a value of 2 means that time elapses twice as fast (and, therefore, the perceived duration ends up being only half that specified by the Duration attribute). This value may be negative, in which case time flows backwards in this timeline, from end to begin times, as if the parent timeline was reversed. |

Timelines and timed objects share a number of behaviors. For example, an animation can be paused or restarted, and a list of animations may be active or inactive. To maintain consistency, the timed objects implement one or more interfaces that allow access to timing methods and properties.

Graphics scenes can be animated by specifying animated parameters to some rendering operations, or by adding animations to certain element properties. Animations are functions that takes some arbitrary set of inputs (at least one of which generally being a timeline) and produces an output of the right type to be passed to a rendering operation. For example, a PointAnimation converts a timeline progress value into a Point value type. At the same time, various rendering operations that take one or more Point values as parameters can also receive a PointAnimation instead of a Point, in which case the animation function is evaluated at each frame to calculate the Point to use in that frame. Since the values that can be animated have various types, there are also various differently typed animations. However, animations follow a common pattern and implement a common interface.

Animations are functions that map a time value to a value of another type. Each animation has a mapping function and an associated timeline that defines its time behavior. Note that floating-point animations are used in the examples herein, but the concepts covered here apply to other animations, unless otherwise noted. In addition, a "normalized" controlling timeline that has a begin time of zero and a duration of one has been assumed. Different timing effects can be achieved by changing the timing attributes of the associated timeline.

Animations are applied to properties, such as individually or in groups. When a list of animations is applied to a given property, the animations in the list compose together to produce a final result. This can be thought of as a pipeline, in which each animation in the list produces an output that is used as an input to the next animation, and so on. The final value of the property is the output of the last animation. The input to the first animation is a constant called the base value, and it is the value the property would have in the absence of any animations.

One straightforward animation interpolates a value between the begin and end points. When both the begin and end points are specified, the base value is ignored for the time the animation is "on." When the animation is "off," the value of the property reverts to the base value. Note that an animation is "on" as long as its associated timeline is "on," therefore, a from-to animation can be made to permanently override the base value, e.g., by setting the Fill timing attribute to "Freeze."

If only the begin or the end point is specified, but not both, the base value of the property is used for the value of the other point. While this seems redundant with the previous example, a difference is that the base value is not ignored, but composed with the animation. This can produce interesting effects if the base value is changing (because the property is being modified by another process), or if the animation is treed to another animation.

Another way to specify the animation function is to specify a delta from the base value. This is conceptually similar to a from-to animation that interpolates from the base value to the base value plus the delta. However, in this case, both the begin and end points are composed with the base value. Instead of repeating the same trajectory on every iteration, an animation can be programmed to accumulate the effect of each iteration, in essence composing with itself.

Although the default behavior of a from-to animation is to ignore the base value of the animated property, this behavior can be changed to an additive behavior, where the from and to values are both deltas from the base value.

The following table summarizes the basic animation types:

| Type | Output value |
|---|---|
| From | The "From" value at t = 0 and the base value at t = 1. |
| To | The base value at t = 0 and the "To" value at t = 1. |
| From-To | The "From" value at t = 0 and the "To" value at t = 1. |
| By | The base value at t = 0 and the sum of the base value and the "By" value at t = 1. |
| From-By | The "From" value at t = 0 and the sum of the "From" and "By" values at t = 1. |

With basic simple animations, the output value at the begin and end points are specified and a linear interpolation is used to compute the values in between. For more complex animation functions, a list of values can be specified instead. Each value corresponds to a key frame. In one straightforward case, these key frames occur at regular intervals. Animations can also be programmed to use a paced spacing between the key frames. In the paced interpolation method, the space between each pair of key frames is proportional to the ratio of the "distance" between the two key values to the "total distance" covered by the animation. This is only possible for those animations whose types have a meaningful concept of "distance," such as, for example, float or point animations. In these cases, the interpolation between key frames is linear. A third option is to not interpolate at all, in which case the output value function is discrete.

For additional control, the time for each key frame can be explicitly specified. The interpolation between the key frames can be linear or discrete. The key times are specified as percentages of the total animation duration, and must cover the entire period. In other words, the first key time must be 0, and for linear interpolation the last key time must be 1.

Finally, for further control over the interpolation, a set of cubic Bezier curves can be used to describe the time curve used for the animation. This should not be confused with a Bezier curve rendered on screen, because the curve is used to modify the shape of the timing curve, but the key frame values still interpolate linearly over the progress value. This spline interpolation method adds a filter that converts the linear 0-1 progress value provided by the timeline associated with the animation into a non-linear 0-1 progress curve.

The following table contains the full list of animation-specific attributes and their meanings. This list is a template followed by animations objects. Where the type of an attribute is "<ValueType>", a real object would expose the attribute with a type matching the animation type. For example, a ColorAnimation object types these attributes as "Color". In addition to the attributes listed below, animation objects support the attributes specified in the ITimingAttributes interface.

| Attribute | Type | Meaning |
|---|---|---|
| By | <ValueType> | The delta value at the end of the animation. The value at the beginning is either the From value, if specified, or the base value of the property. |
| From | <ValueType> | The initial value of the animation. |
| InterpolationMethod | InterpolationMethod | The method used to interpolate between key values. The possible values are Discrete, Linear, Paced or Spline. |
| KeySplines | KeySplineCollection | A set of Bezier control points associated with a KeyTimes list, which defines a cubic function that controls the interval pacing of the animation. This list must contain one less element than the KeyTimes list. This list is only used if the InterpolationMethod attribute is set to Spline. |
| KeyTimes | KeyTimeCollection | A list of time values used to control the pacing of the animation. This list must contain the same number of elements as the KeyValues list. The list must be ordered in increasing time values, and the first value in this list must be 0 and the last 1, unless InterpolationMethod is set to Discrete, in which case the last value may be anything less than or equal to 1. |
| KeyValues | <ValueType>KeyValueCollection | A list of values for the animation. |
| To | <ValueType> | The value at the end of the animation. |

Conclusion

As can be seen from the foregoing detailed description, there is provided a composition service that performs a number of operations, including via a separate thread model that facilitates biasing allocation of system resources to foreground applications and to applications with media-rich or animate content. A protocol is provided to enable communication between clients and the compositor, using a change queue in a highly efficient manner. Animation functions, along with a way to communicate them to the compositor, are is provided to facilitate smooth animation.

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. At a computer system, the computer system including a processor, a system memory, and a graphics subsystem, the computer system also including a compositor, the compositor configured to manage the composing, animation, and rendering of graphical scenes which are provided to the graphics subsystem, the computer system also including a plurality of clients that can provide instructions to the compositor for modifying graphical scenes, a computer implemented method for receiving a structural update to a graphical scene, the computer implemented method comprising:

receiving a compositing change request from a client program, the compositing chain request requesting a compositing chain between the client program, the compositor component, and a client manager;

accessing a media instruction block containing rendering instructions representing a structural update to a graphical scene, the graphical scene represented in a tree data structure maintained by the compositor, the media instruction block referenced through a handle that was previously returned from a rendering call;

in response to the request, communicating from the compositor to the client manager to register the media instruction block with the compositor; and asynchronously communicating the media instruction block to the compositor in accordance with flow control components that mediate the incoming instruction flow into the compositor between the plurality of clients; and updating a handle table in the compositor to include the handle for the media instruction block such that the handle can be resolved to the media instruction block for subsequent incorporation of the structural update into the tree data structure for the graphical scene.

2. The method of claim 1 wherein communicating at least one structural request to the client manager comprises communicating a request to insert data corresponding to a compositable object into the data structure.

3. The method of claim 1 wherein communicating at least one structural request to the client manager comprises communicating a request to insert data corresponding to a media instruction block into the data structure.

4. The method of claim 1 wherein the structural request corresponds to an item of a set of possible items, the set comprising: a compositable object insert media instruction block, a compositable object delete media instruction block, a compositable object replace media instruction block, a group insert compositable object, a group delete compositable object, a group replace compositable object, a tree insert compositable object, a tree delete compositable object, a tree replace compositable object, a tree insert group, a tree delete group, a tree replace group, or a target associate tree.

5. The method of claim 1 further comprising, in response to a call from the client program, asynchronously communicating at least one attribute request to the client manager, such that the client manager can modify an attribute related to data in the tree data structure.

6. The method of claim 5 wherein the attribute corresponds to an item of a set of possible items, the set comprising: a compositable object rectangle, a compositable object transform, a compositable object clip, a compositable object hit, a compositable object alpha, a compositable object blendmode, a compositable object media instruction blockcount, a compositable object media instruction block at, a group rectangle, a group transform, a group clip, a group hit, a group alpha, a group blendmode, a group compositable object count, a group compositable object at, a tree childcount, or a tree child at.

7. The method of claim 1 further comprising, in response to a call from the client program, asynchronously communicating at least one registration request to the client manager.

8. The method of claim 7 wherein the registration request corresponds to an item of a set of possible items, the set comprising the following items: a resource image, a resource brush, a resource pen, a resource video, a resource transform, a resource path, a media instruction block, a compositable object, a group, a tree, a target.

9. The method of claim 1 further comprising, in response to at least one call from the client program, asynchronously communicating a batch request to the client manager.

10. The method of claim 1 further comprising in response to at least one call from the client program, asynchronously communicating an update request to the client manager.

11. A computer system, the computer system comprising:
one or more processors;
system memory; and
one or more physical storage media having stored thereon computer-executable instructions representing client program, a client manager, and a compositor component, wherein the client program is configured to:
send a compositing change request to the compositor, the compositing chain request requesting a compositing chain between the client program, the compositor component, and the client manager;
access a media instruction block containing rendering instructions representing a structural update to a graphical scene, the graphical scene represented in a tree data structure maintained by the compositor, the media instruction block referenced through a handle that was previously returned from a rendering call; and
in response to the request, communicate with the compositor component to register the media instruction block with the compositor;
asynchronously communicate the media instruction block to the compositor component in accordance with flow control components that mediate the incoming flow of instructions into the compositor component between a plurality of clients including the client program; and
wherein the compositor component is configured to:
receive the compositing change request from the client program;
communicate with the client program to register the media instruction block with the compositor component:
asynchronously communicate with the client program to receive the media instruction block in accordance with the flow control components;
update a handle table in the compositor to include the handle for the media instruction block such that the handle can be resolved to the media instruction block for subsequent incorporation of the structural update into the tree data structure for the graphical scene;
subsequently process the media instruction block to incorporate the structural update into the tree structure to change at least one timing value in the tree data structure to produce an animation effect for an image corresponding to data in the tree data structure that is output over at least two frames such that the client manager can maintain a tree data structure containing composited data corresponding to the structured content.

12. The system of claim 11 wherein the compositor component communicates a first set of data corresponding to at least one structural request to the client manager, a second set of data corresponding to at least one media instruction block request to the client manager, or both first and second sets of data.

13. The system of claim 11 wherein the compositor component communicates a first set of data corresponding to at least one attribute request to the client manager, a second set of data corresponding to at least one batch request to the client manager, a third set of data corresponding to at least one update request to the client manager, or any combination of first, second and third sets of data.

14. The system of claim 11 wherein the request includes a unique client identifier.

15. The system of claim 11 further comprising a compositing tree manager coupled to the client manager and at least one other client manager, for combining data maintained by each client manager.

16. A computer program product for use at a computer system including a processor, a system memory, and a graphics subsystem, the computer system also including a compositor, the compositor configured to manage the composing, animation, and rendering of graphical scenes which are provided to the graphics subsystem, the computer system also including a plurality of clients that can provide instructions to the compositor for modifying graphical scenes, the computer program product comprising physical storage medium storing computer-executable instructions, which when executed at the processor, cause the computer system to perform the method including the following:

access a media instruction block containing rendering instructions representing a structural update to a graphical scene, the graphical scene represented in a tree data structure maintained by the compositor, the media instruction block referenced through a handle that was previously returned from a rendering call at client manager;

communicate from the compositor to a client manager to register the media instruction block with the compositor with the;

asynchronously communicate the media instruction block to the compositor in accordance with flow control components that mediate the incoming instruction flow into the compositor between the plurality of clients;

update a handle table in the compositor to include the handle for the media instruction block such that the handle can be resolved to the media instruction block for subsequent incorporation of the structural update into the tree data structure for the graphical scene; and subsequently process the media instruction block to incorporate the structure update into the tree structure to change at least one timing value in the tree data structure to produce an animation effect for an image corresponding to data in the tree data structure that is output over at least two frames.

17. The computer program product of claim 16 wherein changing at least one value in the tree data structure occurs at the client manager, without a separate instruction to the client manager for each change.

18. The computer program product of claim 17 wherein the client manager changes the at least one value in the tree data structure by adjusting time-stamped data to correspond to a timeline.

* * * * *